US012762706B2

(12) United States Patent
Morvan et al.

(10) Patent No.: US 12,762,706 B2
(45) Date of Patent: Oct. 13, 2026

(54) IMAGE SEGMENTATION FOR SETS OF OBJECTS

(71) Applicant: Howmedica Osteonics Corp., Mahwah, NJ (US)

(72) Inventors: Yannick Morvan, Saint Renan (FR); Manuel Jean-Marie Urvoy, Brest (FR); Thibaut Nico, Brest (FR); Julien Ogor, Brest (FR)

(73) Assignee: Howmedica Osteonics Corp., Mahwah, NJ (US)

( * ) Notice: Subject to any disclaimer, the term of this patent is extended or adjusted under 35 U.S.C. 154(b) by 591 days.

(21) Appl. No.: 17/928,599

(22) PCT Filed: Jun. 11, 2021

(86) PCT No.: PCT/US2021/036967
§ 371 (c)(1),
(2) Date: Nov. 29, 2022

(87) PCT Pub. No.: WO2021/252868
PCT Pub. Date: Dec. 16, 2021

(65) Prior Publication Data

US 2023/0207106 A1 Jun. 29, 2023

Related U.S. Application Data

(60) Provisional application No. 63/038,350, filed on Jun. 12, 2020.

(51) Int. Cl.
*G06T 7/11* (2017.01)

(52) U.S. Cl.
CPC ...... *G06T 7/11* (2017.01); *G06T 2207/20084* (2013.01); *G06T 2207/20132* (2013.01); *G06T 2207/30008* (2013.01)

(58) Field of Classification Search
None
See application file for complete search history.

(56) References Cited

U.S. PATENT DOCUMENTS

| | | | |
|---|---|---|---|
| 7,492,968 | B2 | 2/2009 | Jerebko et al. |
| 8,884,618 | B2 | 11/2014 | Mahfouz |

(Continued)

FOREIGN PATENT DOCUMENTS

| | | | |
|---|---|---|---|
| CN | 110796636 | A | 2/2020 |
| WO | 2009109971 | A2 | 9/2009 |
| WO | 2022037696 | A1 | 2/2022 |

OTHER PUBLICATIONS

Frank, Susan, and Arie Kaufman. "Distributed volume rendering on a visualization cluster." Ninth International Conference on Computer Aided Design and Computer Graphics (CAD-CG'05). IEEE, 2005. (Year: 2005).*

(Continued)

*Primary Examiner* — Vincent Rudolph
*Assistant Examiner* — Meredith Taylor
(74) *Attorney, Agent, or Firm* — Shumaker & Sieffert, P.A.

(57) ABSTRACT

A computing system may generate an initial segmentation mask by applying a neural network to a 3D image of a set of objects. The initial segmentation mask associates voxels of the 3D image with individual objects of the set of objects. Additionally, the computing system generates a refined segmentation mask. As part of generating the refined segmentation mask, the computing system performs, for each respective object, a front propagation process for the respective object. The front propagation process for the respective object uses input voxel data to relabel, in the refined segmentation mask, voxels of the 3D image as being associated with the respective object. A stopping condition of a path evaluated by the front propagation process for the (Continued)

respective object occurs when the front propagation process evaluates a voxel identified in the initial segmentation mask as being associated with a different one of the objects from the respective object.

9 Claims, 10 Drawing Sheets

(56) References Cited

U.S. PATENT DOCUMENTS

| | | | |
|---|---|---|---|
| 9,111,180 | B2 | 8/2015 | Rappaport et al. |
| 9,218,524 | B2 | 12/2015 | Wang et al. |
| 9,495,752 | B2 | 11/2016 | Wu et al. |
| 9,646,229 | B2 | 5/2017 | Sofka et al. |
| 9,959,486 | B2 | 5/2018 | Kiraly et al. |
| 10,062,014 | B2 | 8/2018 | Zhou et al. |
| 10,217,238 | B2 | 2/2019 | Ostrovsky-Berman et al. |
| 10,438,350 | B2 | 10/2019 | Patil et al. |
| 10,482,603 | B1 | 11/2019 | Fu et al. |
| 10,580,131 | B2 | 3/2020 | Mazo |
| 10,582,907 | B2 | 3/2020 | Chen et al. |
| 10,769,791 | B2 | 9/2020 | Song et al. |
| 10,825,168 | B2 | 11/2020 | Tegzes et al. |
| 10,973,486 | B2 | 4/2021 | Sjostrand et al. |
| 11,055,851 | B2 | 7/2021 | Novikov et al. |
| 11,090,019 | B2 | 8/2021 | Siemionow et al. |
| 11,158,061 | B2 | 10/2021 | De Winde |
| 11,263,772 | B2 | 3/2022 | Siemionow et al. |
| 11,288,808 | B2 | 3/2022 | Abramoff et al. |
| 11,348,257 | B2 | 5/2022 | Lang |
| 11,386,988 | B2 | 7/2022 | Johnsson et al. |
| 11,423,540 | B2 | 8/2022 | Heindl et al. |
| 11,443,428 | B2 | 9/2022 | Petersen et al. |
| 11,449,993 | B2 | 9/2022 | Book et al. |
| 11,626,212 | B2 | 4/2023 | Crawford et al. |
| 11,657,508 | B2 | 5/2023 | Richter et al. |
| 11,682,117 | B2 | 6/2023 | Fuchs et al. |
| 2012/0230572 | A1 | 9/2012 | Kohlberger et al. |
| 2018/0240235 | A1 | 8/2018 | Mazo |
| 2018/0315188 | A1 | 11/2018 | Tegzes et al. |
| 2019/0105009 | A1 | 4/2019 | Siemionow et al. |
| 2020/0245960 | A1 | 8/2020 | Richter et al. |
| 2020/0311937 | A1 | 10/2020 | Wang et al. |
| 2020/0410687 | A1 | 12/2020 | Siemionow et al. |
| 2021/0019889 | A1 | 1/2021 | Novikov et al. |
| 2021/0369226 | A1 | 12/2021 | Siemionow et al. |
| 2022/0051045 | A1 | 2/2022 | Vandersmissen |
| 2022/0058809 | A1 | 2/2022 | Fuchs et al. |
| 2022/0270762 | A1 | 8/2022 | Crawford et al. |

OTHER PUBLICATIONS

Artraksa, Siwakorn, John Gatewood Ham, and Krisana Chinnasarn. "Segmentation of Shinbone Interosseous Space using GVF Techniques." 2019 4th International Conference on Information Technology (InCIT). IEEE, 2019. (Year: 2019).*

Thomas, Sarina, et al. "Computer-assisted intra-operative verification of surgical outcome for the treatment of syndesmotic injuries through contralateral side comparison." International Journal of Computer Assisted Radiology and Surgery 14.12 (2019): 2211-2220. (Year: 2019).*

"Fast Marching Method," Wikipedia, last updated on Aug. 26, 2019, https:/fen.wikipedia.orgfwiki/Fast_marching_method, 3 pp.

Boissonnat et al., "Shape Reconstruction from Planar Cross Sections," Computer Vision, Graphics, and Image Processing, vol. 44, No. 1, Oct. 1988, 29 pp.

Bullock et al., "XNet: A Convolutional Neural Network (CNN) Implementation for Medical X-Ray Image Segmentation Suitable for Small Datasets," Biomedical Applications in Molecular, Structural, and Functional Imaging, Mar. 2019, 11 pp.

Caliva et al., "Distance Map Loss Penalty Term for Semantic Segmentation," Medical Imaging with Deep Learning MIDL 2019, Aug. 2019, 5 pp.

Deschamps et al., "Fast Extraction of Minimal Paths in 3D Images and Applications to Virtual Endoscopy," Medical Image Analysis, vol. 5, No. 4, Jan. 2002, 19 pp.

Frangi et al., "Chapter 2 Multiscale Vessel Enhancement Filtering," Medical Image Computing and Computer- Assisted Intervention—MICCAI'98 First International Conference, Cambridge, MA, USA, Oct. 11-13, 1998, 10 pp.

Hu et al., "Image segmentation and registration for the analysis of joint motion from 3D MRI", Proceedings of SPIE, vol. 61410H-10, Mar. 2006, 11 pp.

International Preliminary Report on Patentability from International Application No. PCT/US2021/036967 dated Dec. 22, 2022, 14 pp.

International Search Report and Written Opinion of International Application No. PCT/US2021/036967, dated Nov. 15, 2021, 21 pp.

Invitation to Pay Additional Fees and, Where Applicable, Protest Fee from International Application No. PCT/US2021/036967, dated Sep. 23, 2021, 16 pp.

Kwolek et al., "Measuring Lower Limb Alignment and Joint Orientation Using Deep Learning Based Segmentation of Bones," Hybrid Artificial Intelligent Systems, Aug. 2019, 13 pp.

Liu et al., "Multi-class Gradient Harmonized Dice Loss with Application to Knee MR Image Segmentation", Medical Image Computing and Computer Assisted Intervention—MICCAI 2019, Oct. 2019, pp. 86-94.

Marker et al., "Contour-Based Surface Reconstruction using Implicit Curve Fitting, and Distance Field Filtering and Interpolation," Volume Graphics, Jan. 2006, 9 pp.

Milletari et al., "V-Net: Fully Convolutional Neural Networks for Volumetric Medical Image Segmentation," Conference: 2016 Fourth International Conference on 3D Vision (3DV), Oct. 2016, 11 pp.

Nguyen et al., "A New Segmentation Method for MRI Images of the Shoulder Joint," Fourth Canadian Conference on Computer and Robot Vision(CRV'07), May 2007, 8 pp.

Wang et al., "Semi-Automatic Segmentation of JIA-induced Inflammation in MRI Images of Ankle Joints," Progress in Biomedical Optics and Imaging, SPIE International Society for Optical Engineering, vol. 10949, Mar. 15, 2019, 7 pp. ENGINEERING.

Zhou et al., "Automatic segmentation algorithm of femur and tibia based on Vnet-C network", 2019 Chinese Automation Congress, Nov. 2019, pp. 3066-3069.

Zhou et al., "Deep convolutional neural network for segmentation of knee joint anatomy", Magnetic Resonance in Medicine, vol. 80, No. 6, May 2018, pp. 2759-2770.

Response to Communication Pursuant to Rules 161(1) and 162 EPC dated Jan. 27, 2023, from counterpart European Application No. 21736923.0, filed Jun. 20, 2023, 27 pp.

Ronneberger, "U-Net: Convolutional Networks for Biomedical Image Segmentation," MICCAI 2015, May 2015, 8 pp.

Notice of Intent to Grant and Text Intended to Grant from counterpart European Application No. 21736923.0 dated Apr. 16, 2026, 103 pp.

* cited by examiner

IMAGE SEGMENTATION FOR SETS OF OBJECTS

This application is a national stage application under 35 U.S.C. § 371 of PCT Application No. PCT/US2021/036967, filed Jun. 11, 2021, which claims the benefit of U.S. Provisional Application No. 63/038,350, filed Jun. 12, 2020, the entire content of both of which are incorporated herein by reference.

BACKGROUND

In many situations, it is important to understand the 3-dimensional sizes, shapes, and positions of a set of objects. For example, in many types of surgical procedures, it is important for surgeons to understand the 3-dimensional sizes, shapes, and positions of a patient's bones. However, it is not always easy to do so. For instance, it may be difficult for a surgeon to understand 3-dimensional sizes, shapes, and positions of a patient's bones when reviewing medical images, such as computed tomography (CT) or x-ray images. Accordingly, image segmentation techniques have been developed to help automate the process of determining the boundaries of objects, such as bones within images, such as medical images.

SUMMARY

This disclosure describes example techniques that may improve computerized image segmentation processes for sets of objects. This disclosure primarily refers to sets of bones, the techniques of this disclosure may apply to other types of objects, such as machine parts. In examples where the objects are bones, the techniques of this disclosure may be especially useful with respect to lower extremities, such as the ankle and foot, of a human patient. As described herein, a computing system obtains a 3-dimensional (3D) image of a set of bones of a patient, such as the ankle and/or foot bones of the patient. The computing system generates an initial segmentation mask by applying a neural network to the 3D image. The initial segmentation mask includes data that associate voxels of the 3D image with individual bones of the set of bones. Additionally, the computing system may generate a refined segmentation mask based on the initial segmentation mask. As part of generating the refined segmentation mask, the computing system may, for each respective bone of the set of bones, the computing system may perform a front propagation process for the respective bone. The front propagation process for the respective bone identifies voxels of the 3D image reached by a front propagated by the front propagation process for the respective object. The front starts from a voxel associated with the respective bone in the initial segmentation mask.

Additionally, the front propagation process for the respective bone relabels, in the refined segmentation mask, the identified voxels of the 3D image as being associated with the respective object. The front propagation process for the respective object determines a cost value for a voxel of the 3D image based on an input voxel data value for the voxel and determines whether the front propagates to the voxel based on a comparison of the cost value for the voxel as determined by the front propagation process for the respective object and a cost value for the voxel as determined by the front propagation process for a different one of the objects. The computing system may output the refined segmentation mask. A human or computer may use the refined segmentation process for the purpose of planning a surgical procedure, manufacturing patient-specific components, providing surgical recommendations, and other activities.

In one example, this disclosure describes a method for performing computerized segmentation of 3-dimensional images, the method comprising: obtaining, by a computing system, a 3-dimensional (3D) image of a set of objects; generating, by the computing system, an initial segmentation mask by applying a neural network to the 3D image, wherein the initial segmentation mask includes data that associate voxels of the 3D image with individual objects of the set of objects; generating, by the computing system, a refined segmentation mask based on the initial segmentation mask, wherein generating the refined segmentation mask comprises: generating input voxel values for voxels in the 3D image; and for each respective object of the set of objects, performing, by the computing system, a front propagation process for the respective object, wherein performing the front propagation process for the respective object comprises: identifying voxels of the 3D image reached by a front propagated by the front propagation process for the respective object, wherein the front starts from a voxel associated with the respective bone in the initial segmentation mask; and relabeling, in the refined segmentation mask, the identified voxels of the 3D image as being associated with the respective object, wherein the front propagation process for the respective object determines a cost value for a voxel of the 3D image based on an input voxel data value for the voxel and determines whether the front propagates to the voxel based on a comparison of the cost value for the voxel as determined by the front propagation process for the respective object and a cost value for the voxel as determined by the front propagation process for a different one of the objects; and outputting, by the computing system, the refined segmentation mask.

In another example, this disclosure describes a method for performing computerized segmentation of 3-dimensional (3D) medical images of lower extremities of patients, the method comprising: partitioning, by a computing system, a 3D image of a set of bones in a lower extremity of a patient into a 3D image of an ankle region of the lower extremity of the patient, a 3D image of a forefoot region of the lower extremity of the patient, and a 3D image of a transition region of the lower extremity of the patient; performing, by the computing system, a first segmentation process that generates a first segmentation mask based on the 3D image of the ankle region; performing, by the computing system, a second segmentation process that generates a second segmentation mask based on the 3D image of the forefoot region; performing, by the computing system, a third segmentation process that generates a third segmentation mask based on the 3D image of the transition region; and compositing the first segmentation mask, the second segmentation mask, and the third segmentation mask to generate a fourth segmentation mask.

In another example, this disclosure describes a computing system comprising memory storing a 3-dimensional image of a set of objects; and processing circuitry configured to perform the methods of this disclosure. In another example, this disclosure describes a computing system comprising means for performing the methods of this disclosure. In another example, this disclosure describes a computer-readable storage medium having stored thereon that, when executed, cause processors to perform the methods of this disclosure.

The details of various examples of the disclosure are set forth in the accompanying drawings and the description below. Various features, objects, and advantages will be apparent from the description, drawings, and claims.

DETAILED DESCRIPTION

Figure 1:
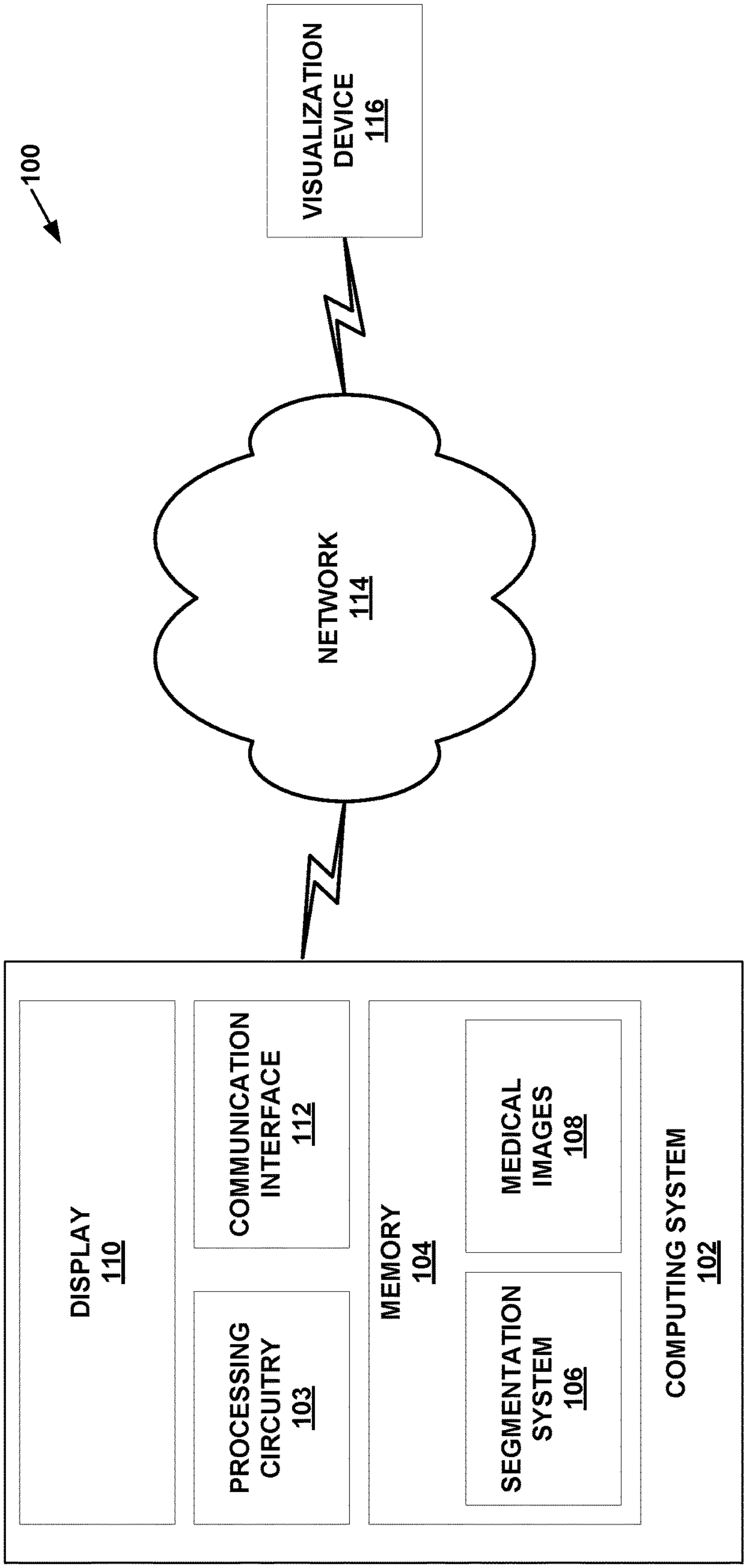
FIG. 1 is a block diagram illustrating an example system that may be used to implement the techniques of this disclosure.

A patient may suffer from a disease that causes damage to the patient's anatomy, or the patient may suffer an injury that causes damage to the patient's anatomy. For lower extremities, as an example of patient anatomy, a patient may suffer from osteoarthritis, rheumatoid arthritis (RA), ligament tears, post-traumatic arthritis (PTA), or acute fracture, as a few examples. A surgeon may perform a surgical procedure to address the disease or injury, such as a total ankle replacement (TAR) procedure, a trauma repair surgery, or another type of surgery. Although this disclosure is primarily described with respect to lower extremities, the techniques of this disclosure may be applicable to other parts of a human or animal body, such as the hand and wrist. The techniques of this disclosure may be especially advantageous in regions that involve multiple closely placed bones. Moreover, while this disclosure is described with respect to bones, the techniques of this disclosure may be applicable to other types of objects.

There may be benefits for a surgeon to determine, prior to the surgery, characteristics (e.g., size, shape, and/or location) of the patient's anatomy. For instance, determining the characteristics of the patient anatomy may aid in prosthetic selection, design, manufacture and/or positioning, as well as planning and guidance of surgical steps to prepare surfaces of damaged bones to receive or interact with one or more prosthetics. With advance planning, the surgeon can determine, prior to surgery, rather than during surgery, steps to prepare bone or tissue, tools that will be needed, sizes and shapes of the tools, the sizes and shapes or other characteristics of one or more protheses that will be implanted and the like. In some examples, with advance planning, a computing system may perform automated classification and/or automatically generate recommendations.

As part of determining characteristics of the patient anatomy, a computing system may obtain medical images of the anatomy of the patient. Additionally, the computing system may perform a segmentation process on the medical images to generate segmentation masks. A segmentation mask includes data that associate voxels of a medical image with individual bones. By reviewing a segmentation mask, it may be easier for a surgeon to determine certain characteristics of the anatomy of the patient than if the surgeon were to directly review the medical images.

There are several challenges associated with implementing effective computerized segmentation processes, especially for parts of the patient's body that include numerous closely spaced bones, such as the lower extremities (including the ankle and foot) and the hands and wrists. For example, existing segmentation processes that implement front propagation process, such as fast marching algorithms, exhibit a tendency toward over-segmentation. Over-segmentation occurs when a segmentation process identifies soft tissue as being part of a bone or identifies two closely spaced bones as being the same bone. Thus, over-segmentation may lead to errors. Other challenges associated with implementing effective computerized segmentation processes include problems associated with managing limited computing resources when performing the segmentation processes.

This disclosure describes techniques that may address one or more challenges associated with implementing effective computerized segmentation processes. For instance, in one example, a computing system may obtain a 3-dimensional (3D) image of a set of bones of a patient, such as the bones of a foot and/or ankle of the patient. Additionally, the computing system may generate an initial segmentation mask by applying a neural network to the 3D image. The initial segmentation mask includes data that associate voxels of the 3D image with individual bones of the set of bones. The computing system may generate a refined segmentation mask based on the initial segmentation mask. As part of generating the refined segmentation mask, the computing system may generate, based on the 3D image, input voxel values for voxels in the 3D image. For instance, the computing system may generate a Hessian map based on the 3D image.

Furthermore, as part of generating the refined segmentation mask, the computing system may, for each respective bone of the set of bones, perform a front propagation process for the respective bone. The front propagation process for the respective bone determines cost values for voxels in the 3D image. Moreover, the front propagation process for the respective bone identifies voxels of the 3D image reached by a front propagated by the front propagation process for the respective object. The front starts from a voxel associated with the respective bone in the initial segmentation mask. The front propagation process for the respective bone relabels, in the refined segmentation mask, the identified voxels of the 3D image as being associated with the respective object. Furthermore, the front propagation process for the respective bone evaluates a stopping condition. When evaluating the stopping condition, the front propagation process for the respective bone determines whether the front propagates to a voxel of the 3D image based on a comparison of the cost value for the voxel as determined by the front propagation process for the respective bone and a cost value for the voxel as determined by the front propagation process for a different one of the bones. For instance, the front propagation process for the respective bone may determine that the front does not propagate to the voxel if the cost value for the voxel as determined by the front propagation process for the respective bone is greater than the cost value for the voxel as determined by the front propagation process for the other bone. The computing system may then output the refined segmentation mask. By using this stopping condition, the tendency of the front propagation process toward over-segmentation may be diminished.

Furthermore, in some examples, a computing system may partition a 3D image of a set of bones in a lower extremity of a patient into a 3D image of an ankle region of the lower extremity of the patient, a 3D image of a forefoot region of the lower extremity of the patient, and a 3D image of a transition region of the lower extremity of the patient. The computing system may then perform a first segmentation process that generates a first segmentation mask based on the 3D image of the ankle region. The computing system may also perform a second segmentation process that generates a second segmentation mask based on the 3D image of the forefoot region. The computing system may then perform a third segmentation process that generates a third segmentation mask based on the 3D image of the transition region. The computing system may composite the first segmentation mask, the second segmentation mask, and the third segmentation mask to generate a fourth segmentation mask.

By processing the 3D image in this way, the computing system may reduce computational costs that may be incurred by attempting to perform a full segmentation of the bones of the foot and ankle in a single segmentation process. Additionally, by using the third segmentation process to segment bones in the transition region, ambiguous or incorrect segmentation information associated with bones that span the ankle region and forefoot region may be replaced with segmentation data that includes complete versions of the bones in the transition region.

FIG. 1 is a block diagram illustrating an example system 100 that may be used to implement the techniques of this disclosure. FIG. 1 illustrates computing system 102, which is an example of one or more computing devices that are configured to perform one or more example techniques described in this disclosure.

Computing system 102 may include various types of computing devices, such as server computers, personal computers, smartphones, laptop computers, and other types of computing devices. In some examples, computing system 102 includes multiple computing devices that communicate with each other. In other examples, computing system 102 includes only a single computing device. Computing system 102 includes processing circuitry 103, memory 104, and a display 110. Display 110 is optional, such as in examples where computing system 102 is a server computer.

Examples of processing circuitry 103 include one or more microprocessors, digital signal processors (DSPs), application specific integrated circuits (ASICs), field programmable gate arrays (FPGAs), discrete logic, software, hardware, firmware or any combinations thereof. In general, processing circuitry 103 may be implemented as fixed-function circuits, programmable circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits. In some examples, processing circuitry 103 is dispersed among a plurality of computing devices in computing system 102. In some examples, processing circuitry 103 is contained within a single computing device of computing system 102.

Processing circuitry 103 may include arithmetic logic units (ALUs), elementary function units (EFUs), digital circuits, analog circuits, and/or programmable cores, formed from programmable circuits. In examples where the operations of processing circuitry 103 are performed using software executed by the programmable circuits, memory 104 may store the object code of the software that processing circuitry 103 receives and executes, or another memory within processing circuitry 103 (not shown) may store such instructions. Examples of the software include software designed for surgical planning, including image segmentation.

Memory 104 may be formed by any of a variety of memory devices, such as dynamic random access memory (DRAM), including synchronous DRAM (SDRAM), magnetoresistive RAM (MRAM), resistive RAM (RRAM), or other types of memory devices. Examples of display 110 include a liquid crystal display (LCD), a plasma display, an organic light emitting diode (OLED) display, or another type of display device. In some examples, memory 104 may include multiple separate memory devices, such as multiple disk drives, memory modules, etc., that may be dispersed among multiple computing devices or contained within the same computing device.

Computing system 102 may include communication interface 112 that allows computing system 102 to output data and instructions to and receive data and instructions from visualization device 116 via network 114. For example, computing system 102 may output medical images, images of segmentation masks, and other information for display on visualization device 116.

Communication interface 112 may include hardware circuitry that enables computing system 102 to communicate (e.g., wirelessly or using wires) to other computing systems and devices, such as visualization device 116. Network 114 may include various types of communication networks including one or more wide-area networks, such as the Internet, local area networks, and so on. In some examples, network 114 may include wired and/or wireless communication links.

Visualization device 116 may utilize various visualization techniques to display image content to a surgeon. In some examples, visualization device 116 is a computer monitor or display screen. In some examples, visualization device 116 may be a mixed reality (MR) visualization device, virtual reality (VR) visualization device, holographic projector, or other device for presenting extended reality (XR) visualizations. For instance, in some examples, visualization device 116 may be a Microsoft HOLOLENS™ headset, available from Microsoft Corporation, of Redmond, Washington, USA, or a similar device, such as, for example, a similar MR visualization device that includes waveguides. The HOLOLENS™ device can be used to present 3D virtual objects via holographic lenses, or waveguides, while permitting a user to view actual objects in a real-world scene, i.e., in a real-world environment, through the holographic lenses.

Visualization device 116 may utilize visualization tools that are available to utilize patient image data to generate three-dimensional models of bone contours, segmentation masks, or other data to facilitate preoperative planning. These tools may allow surgeons to design and/or select surgical guides and implant components that closely match the patient's anatomy. These tools can improve surgical outcomes by customizing a surgical plan for each patient. An example of such a visualization tool for shoulder repairs is the BLUEPRINT™ system available from Wright Medical Technology, Inc. The BLUEPRINT™ system provides the surgeon with two-dimensional planar views of the bone repair region as well as a three-dimensional virtual model of the repair region. The surgeon can use the BLUEPRINT™ system to select, design or modify appropriate implant components, determine how best to position and orient the implant components and how to shape the surface of the bone to receive the components, and design, select or modify surgical guide tool(s) or instruments to carry out the surgical plan. The information generated by the BLUEPRINT™ system may be compiled in a preoperative surgical plan for the patient that is stored in a database at an appropriate location (e.g., on a server in a wide area network, a local area network, or a global network) where the preoperative surgical plan can be accessed by the surgeon or other care provider, including before and during the actual surgery.

As illustrated in the example of FIG. 1, memory 104 stores instructions that cause processing circuitry to implement a segmentation system 106. In other examples, some or all of segmentation system 106 is implemented in circuitry. For ease of explanation, rather than discussing processing circuitry 103 as performing actions of segmentation system 106 (either directly or by executing instructions), this disclosure may simply refer to segmentation system 106 or components thereof as performing the actions.

Additionally, in the example of FIG. 1, memory 104 stores medical images 108. Medical images 108 may include, for example, 3-dimensional (3D) images of a patient. A 3D image includes a set of voxels. Each of the voxels may include an intensity value. An intensity value may correlate to a degree to which matter at a position corresponding to the voxel attenuates radiation (e.g., x-ray radiation). In some examples, the intensity values may be represented in terms of Hounsfield units. In some examples, the 3D images are based on computed tomography (CT) scans of a patient (e.g., as represented by CT scan image data).

In one or more examples, medical images 108 are scans that include one or more anatomical objects that are pathological due to injury or disease (sometimes referred to as "pathological anatomical objects") and one or more anatomical objects that are (i) not injured or diseased (sometimes referred to as "non-pathological anatomical object(s) ") and/or (ii) injured or diseased, but provide more complete image data in medical images 108. For example, the patient may have an injured ankle or foot requiring surgery, and for the surgery or possibly as part of the diagnosis, the surgeon may have requested medical images 108 of the ankle and/or foot bones of the patient to plan the surgery.

Segmentation system 106 may segment medical images 108 so that the surgeon can view anatomical objects (e.g., bones, soft tissue, etc.) and the size, shape, and interconnections of the anatomical objects with other anatomical features of the patient. For instance, segmentation system 106 may generate a segmentation mask based on one of medical images 108 or a composite of two or more of medical images 108. A segmentation mask may contain data that associate voxels (or pixels) with specific anatomical features, such as individual bones or soft tissue. For example, a segmentation mask of a 3D image of a lower extremity of a patient may contain data that associate a first set of voxels with a fibula, a second set of voxels with a tibia, a third set of voxels with a talus, a fourth set of voxels with a navicular bone, and so on. In some examples, voxels associated with different bones may be displayed with different colors according to a color-coding system. By viewing a segmentation mask, a surgeon may be able to understand the sizes, shapes, and relative positioning of bones more easily than simply reviewing a non-segmented 3D medical image. In some examples, computing system 102 may use a segmentation mask for one or more automated surgical planning activities, such as automated recommendation of various surgical parameters.

As briefly mentioned above, the task of automated segmentation of 3D images is associated with several challenges. These challenges include issues associated with how computing system 102 is to reduce the risk that a segmentation algorithm performs over-segmentation and thereby incorrectly associates voxels with bones. Other challenges include how to reduce the risk that a segmentation algorithm incorrectly associates voxels being associated with the same bone when the voxels should be associated with different bones. Furthermore, challenges include how to manage computing resources, such as memory capacity and processing cycles, so that an automated segmentation algorithm can be completed in an efficient manner (e.g., in terms of time to completion, power consumption, etc.)

This disclosure describes techniques that may address one or more of these challenges. For example, this disclosure describes an automated segmentation process in which segmentation system 106 generates an initial segmentation mask using a neural network, such as a convolutional neural network (CNN), and then generates a refined segmentation mask based on the initial segmentation mask. Segmentation system 106 may output the refined segmentation mask, e.g., for display on display 110 or visualization device 116, and/or for further use in one or more automated processes.

In general, the initial segmentation mask is not sufficiently accurate to use on its own, e.g., due to over-segmentation, not recognizing thin areas of cortical bone, classifying marrow bone as soft tissue, and/or identifying isolated voxel clusters as being parts of bones. Other segmentation techniques, such as the use of front propagation processes (e.g., fast marching algorithms) may also include inaccuracies, such as over-segmentation. These challenges may be exacerbated in regions of the body that include large numbers of densely spaced bones, such as the ankle and foot, or hand and wrist. However, using a NN to generate an initial segmentation mask and refining the initial segmentation mask using front propagation processes in the manner described in this disclosure may lead to improved accuracy.

In part because of the relatively large number of bones in the human foot and ankle, performing an automated segmentation process on a foot and ankle may be especially taxing on the computing resources of computing system 102. For instance, if an initial segmentation mask were generated using a NN, the input vector of the NN may be very large and the NN itself may need to include a very large number of weights, each of which may need to be concurrently stored in fast memory. Simply partitioning a 3D image of a human foot into two or more 3D regions may be associated with its own challenges. For instance, there is no simple dividing line within the human foot in which all bones on each side of the dividing line are complete. When a 3D image includes only part of a bone, it may be difficult for the NN to identify the bone. Moreover, it may be difficult for a front propagation process, such as a fast marching algorithm, to determine where such a bone ends. As a result, a final segmentation mask for the foot and ankle may include errors, especially with respect to bones that are not entirely within one of the 3D regions.

As set forth in this disclosure, segmentation system 106 may partition a 3D image of an ankle and foot (i.e., lower extremity) of a patient into three 3D images: a 3D image of a set of bones in an ankle region of the lower extremity of the patient, a 3D image of a set of bones in a forefoot region of the lower extremity of the patient, and a 3D image of a set of bones in a transition region between the ankle region and forefoot region of the lower extremity of the patient. The transition region includes full versions of bones that are incomplete in the 3D image of the ankle region and the 3D image of the forefoot region. For instance, where a dividing line between the ankle region and the forefoot region passes through the cuneiform bones and/or cuboid bone of the lower extremity, the 3D image of the transition region includes complete versions of the cuneiform bones and/or cuboid bone.

Segmentation system 106 may then perform a first segmentation process that generates a first segmentation mask based on the 3D image of the ankle region. Segmentation system 106 may also perform a second segmentation process that generates a second segmentation mask based on the 3D image of the forefoot region. Additionally, segmentation system 106 may perform, by the computing system, a third segmentation process that generates a third segmentation mask based on the 3D image of the transition region. Segmentation system 106 may composite the first segmentation mask, the second segmentation mask, and the third segmentation mask to generate a fourth segmentation mask. The fourth segmentation mask represents the entire lower extremity, including the ankle region, transition region, and forefoot region.

By performing three separate segmentation processes, segmentation system 106 may be able to avoid overburdening memory resources and computing resources of computing system 102. For instance, it may not be necessary for segmentation system 106 to use a single NN with a very large number of weights to generate an initial segmentation mask. Rather, by performing three separate segmentation processes with three separate NNs, e.g., one NN for each segmentation process, fewer weights may need to be loaded into memory at any one time. This may reduce cache misses and page faults, potentially resulting in a faster overall segmentation process. Moreover, calls out to memory associated with cache misses and page faults are associated with increased power consumption, which may be an important consideration when segmentation system 106 runs on a mobile device, such as a mobile phone or tablet computer. Thus, avoiding calls out to memory associated with cache misses and page faults may reduce power consumption.

Figure 2:
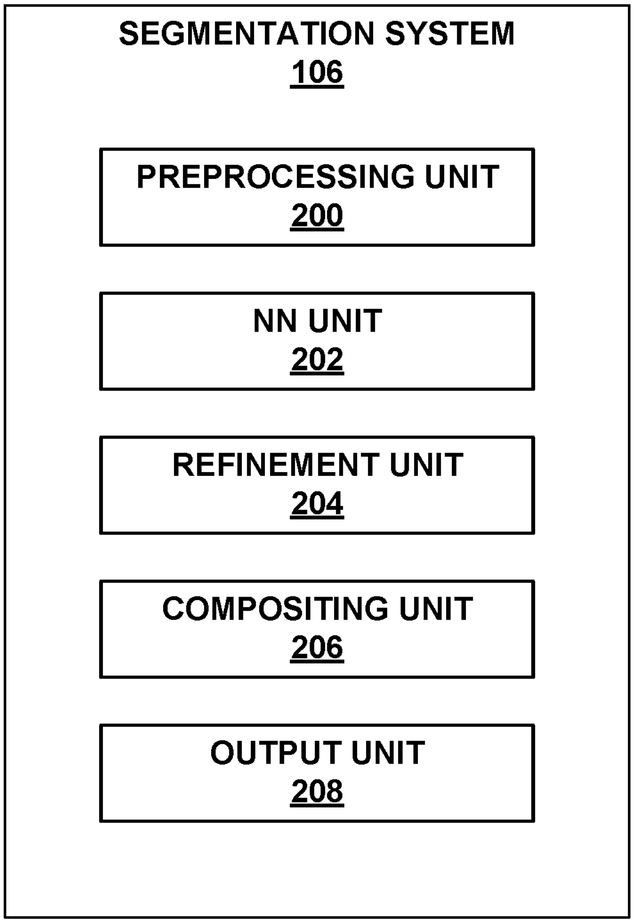
FIG. 2 is a block diagram illustrating example components of a segmentation system, in accordance with one or more techniques of this disclosure.

FIG. 2 is a block diagram illustrating example components of segmentation system 106, in accordance with one or more techniques of this disclosure. In the example of FIG. 2, the components of segmentation system 106 include a preprocessing system 200, a NN unit 202, a refinement unit 204, a compositing unit 206, and an output unit 208. In other examples, segmentation system 106 may be implemented using more, fewer, or different components. For instance, in some examples, segmentation system 106 does not include preprocessing unit 200, compositing unit 206, etc. In some examples, one or more of the components of segmentation system 106 are implemented as software modules. Moreover, the components of FIG. 2 are provided as examples and segmentation system 106 may be implemented in other ways.

Preprocessing unit 200 processes a 3D medical image for use by NN unit 202. NN unit 202 implements a NN that generates an initial segmentation mask based on the 3D medical image. Refinement unit 204 generates a refined segmentation mask based on the initial segmentation mask. Compositing unit 206 generates a composite segmentation mask based on two or more segmentation masks, such as refined segmentation masks generated by refinement unit 204. Output unit 208 outputs segmentation masks. For instance, output unit 208 may output a segmentation mask for display on visualization device 116 or display 110. In some examples, output unit 208 outputs a segmentation mask for storage in memory 104, e.g., for use in one or more computerized surgical planning processes.

As mentioned above, preprocessing unit 200 processes a 3D medical image, such as a CT image or other type of 3D medical image, for use by NN unit 202. In some examples, preprocessing unit 200 obtains the 3D medical image as a DICOM file stored in memory 104. The 3D medical images processed by the NN implemented by NN unit 202 may need to have a consistent input shape. For instance, in one example, the sizes of 3D medical images processed by the NN may be defined as 180, 220, 220 for the X, Y, and Z dimensions, respectively. The sizes of the 3D medical images used by NN unit 202 may be constrained due to limitations on available memory (e.g., Graphics Processing Unit (GPU) memory in cases where NN unit 202 uses a GPU to run the NN).

In some examples, the resolution of the 3D medical images obtained by preprocessing unit 200 is fixed at a particular resolution value that provides an initially accurate representation of bones. For instance, when the resolution value is 0.7 $mm^3$, each voxel of a 3D medical image corresponds to a cube having a volume of 0.7 $mm^3$. Thus, when the dimensions of a 3D medical image are 180, 220, and 220, and the resolution value is 0.7 $mm^3$, the 3D medical image covers a region of 126 mm, 156 mm, and 156 mm along the X, Y, and Z axes, respectively. Because a file containing a 3D medical image may be larger than the input size accepted by the NN, preprocessing unit 200 may perform an image modification process that modifies the 3D medical image for use in the NN.

In some examples, as part of performing the image modification process, preprocessing unit 200 may select a point that is approximately at a midpoint of a set of one or more bones. The selected point serves as a centroid of a bounding box having a size matching an input size of the NN. Preprocessing unit 200 may crop regions of the 3D image outside the box to generate a preprocessed 3D image.

Figure 3:
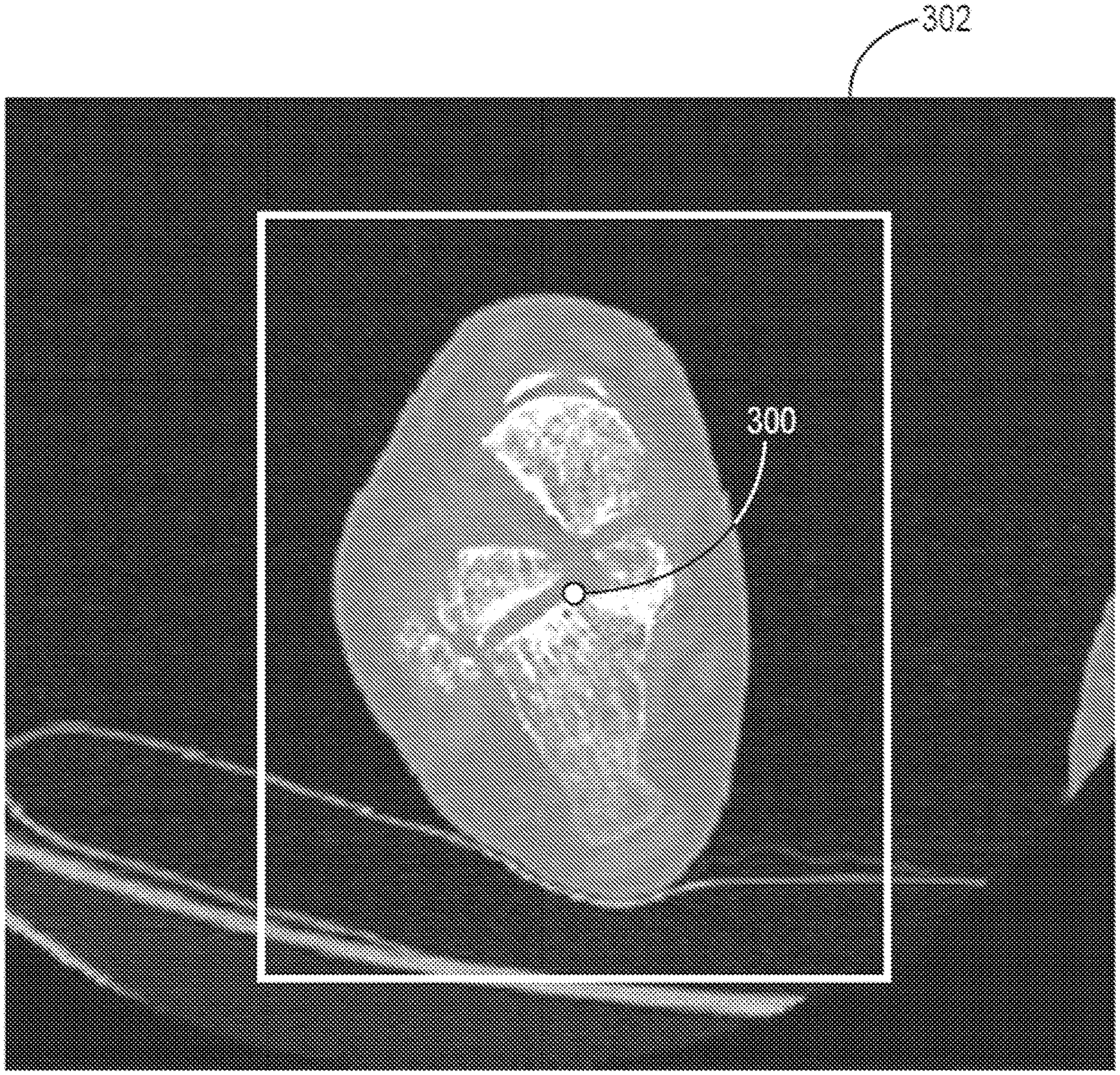
FIG. 3 is a conceptual diagram illustrating an example of a selected point on a Computed Tomography (CT) scan.
Figure 4:
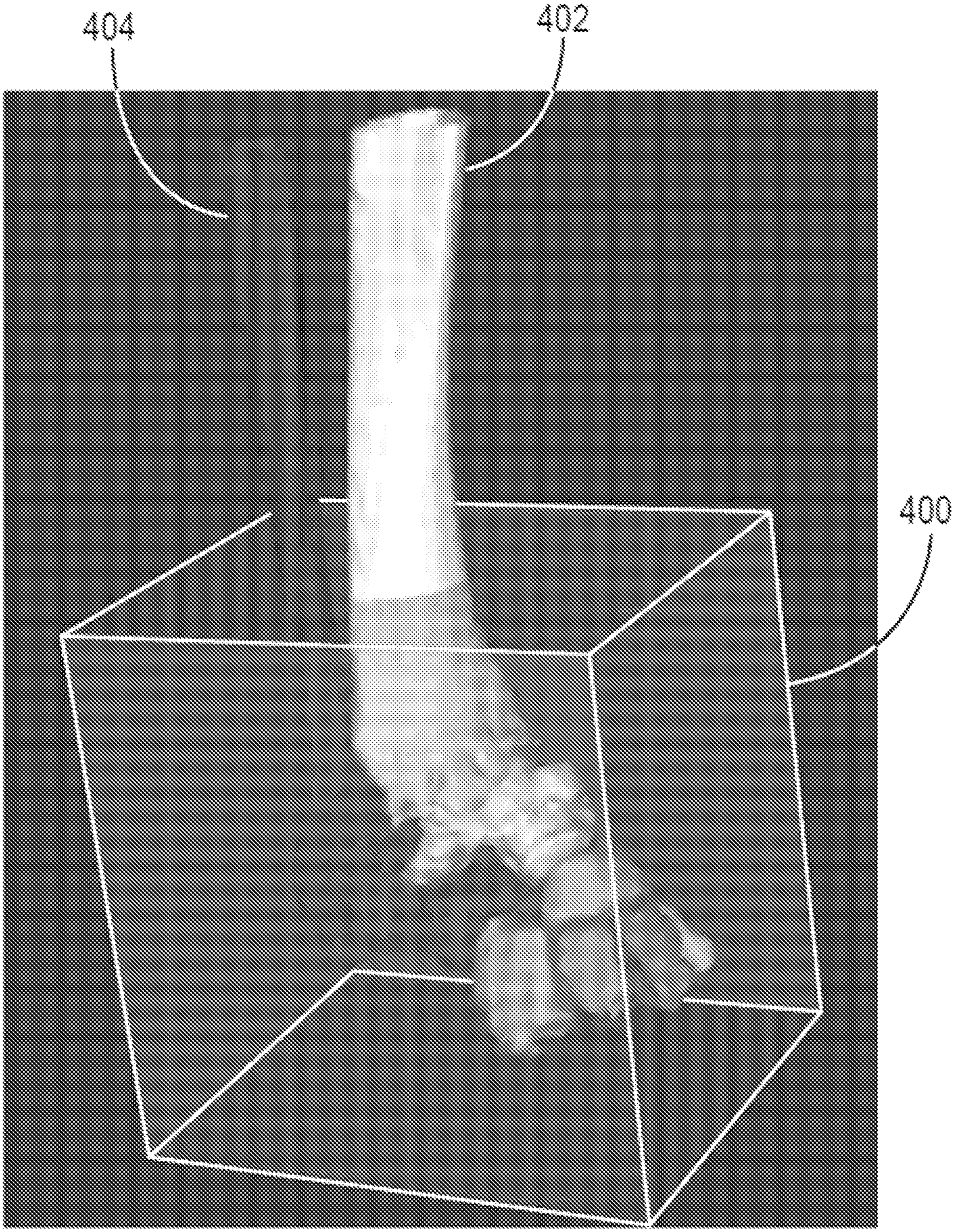
FIG. 4 is a conceptual diagram illustrating an example 3-dimensional (3D) view of a box above segmented bones.

FIG. 3 is a conceptual diagram illustrating an example of a selected point 300 on a CT scan 302. CT scan 302 is an example of a 3D medical image. Selected point 300 may be selected so that the box includes as much bone as possible. For instance, FIG. 4 is a conceptual diagram illustrating an example 3D view of a bounding box 400 above segmented bones. Box 400 has a size matching an input size of the NN. A center of bounding box 400 may be selected so that the box includes as much bone as possible. In some examples, a user of computing system 102 selects the point 300. In other examples, segmentation system 106 selects the center of bounding box 400, e.g., based on an average position of voxels having intensity values over a particular threshold. In the example of FIG. 4, distal tibia 402 and distal fibula 404 pass through an outer edge of bounding box 400. The fact that distal tibia 402 and distal fibula 404 pass through the outer edge of bounding box 400 may not matter for purposes of generating an initial segmentation mask because the portions of distal tibia 402 and distal fibula 404 that are in bounding box 400 may be identified in the initial segmentation mask. The remaining portion of distal tibia 402 and distal fibula 404 outside bounding box 400 may be identified during the refinement process based in part of the portions of distal tibia 402 and distal fibula 404 identified in the initial segmentation mask.

Figure 6:
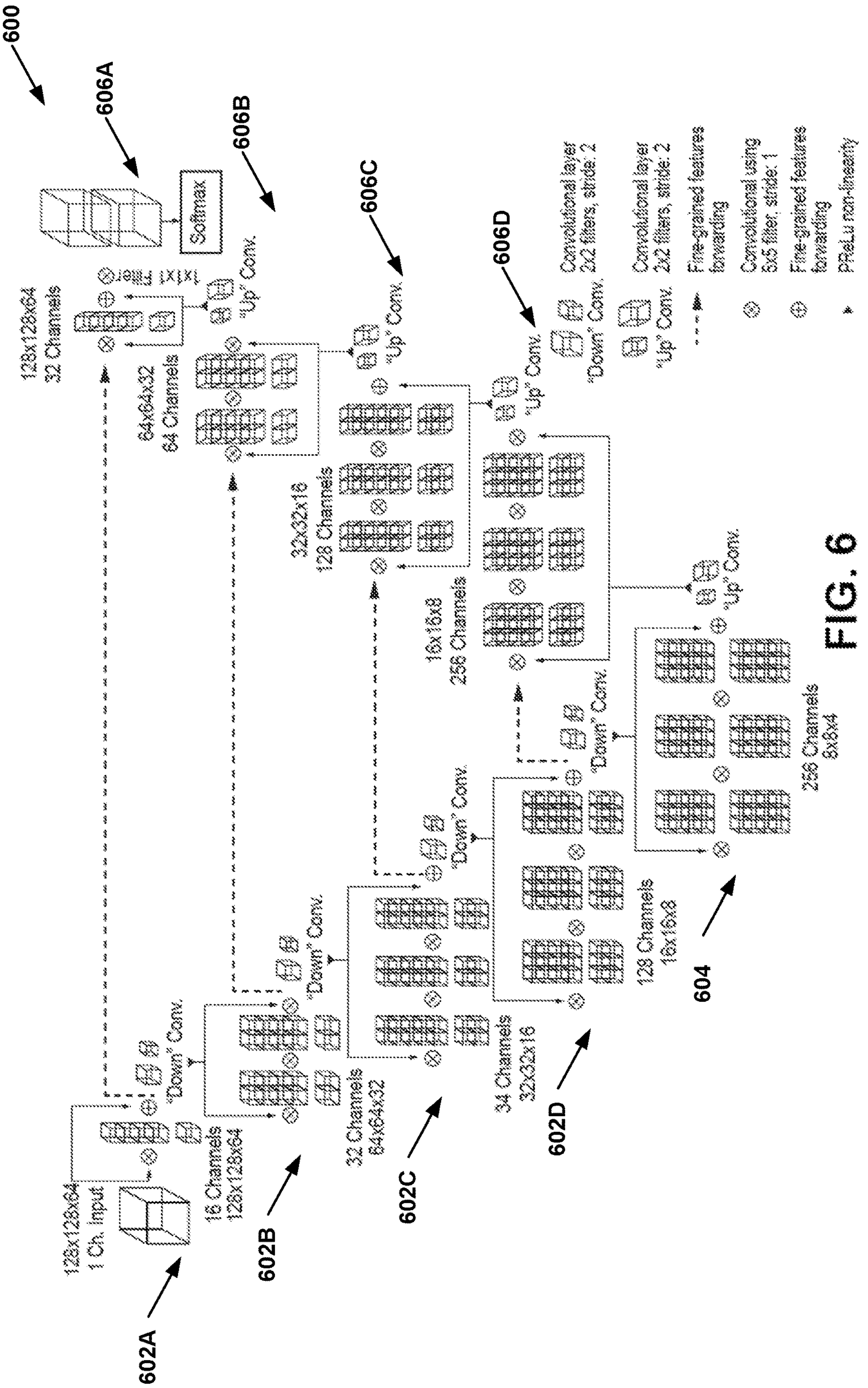
FIG. 6 is a conceptual diagram illustrating an example convolutional neural network architecture in accordance with one or more techniques of this disclosure.

Furthermore, with respect to the example of FIG. 2, NN unit 202 may generate an initial segmentation mask by applying a NN to the 3D image generated by preprocessing unit 200. In different examples, the NN may be implemented and trained in one of various ways. FIG. 6, which is described in greater detail below, is a conceptual diagram illustrating an example implementation of the NN. The initial segmentation mask is a segmentation mask containing data that associate voxels with anatomical features, such as individual bones or soft tissues, or with background content. Background content refers to areas in a 3D image that neither bone nor soft tissue.

Figure 9:
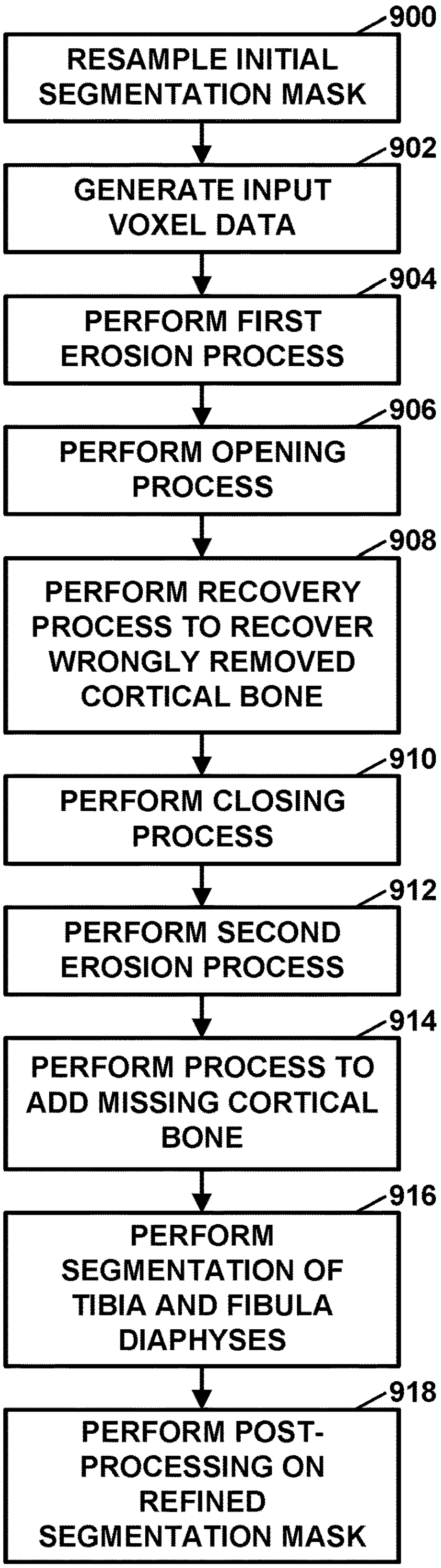
FIG. 9 is a flowchart illustrating an example segmentation refinement process in accordance with one or more techniques of this disclosure.

In the example of FIG. 2, refinement unit 204 generates a refined segmentation mask based on the initial segmentation mask. FIG. 9, which is described in greater detail below, is a flowchart that illustrates an example refinement process. Like the initial segmentation mask, the refined segmentation mask contains data that associate voxels with anatomical features, such as individual bones or soft tissues, or with background content.

Figure 10:
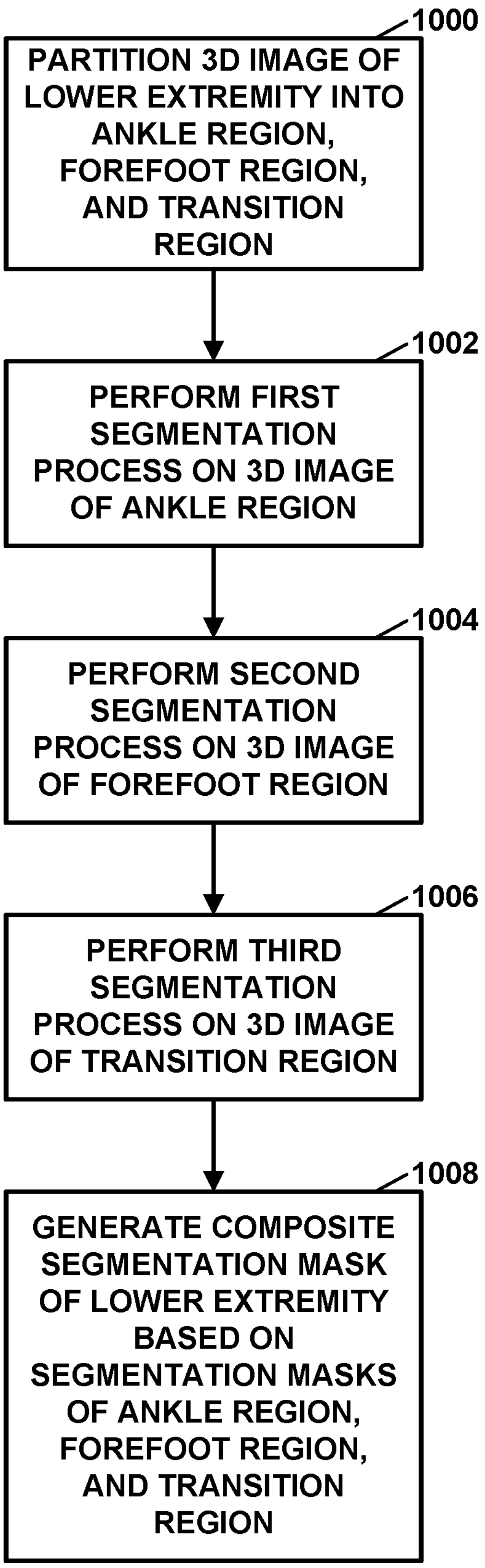
FIG. 10 is a flowchart illustrating an example process for generating a composite segmentation mask in accordance with one or more techniques of this disclosure.

Compositing unit 206 may generate a composite segmentation mask based on two or more segmentation masks. For instance, in accordance with a technique of this disclosure, compositing unit 206 may generate a composite segmentation mask based on a segmentation mask of an ankle region of a lower extremity of a patient, a segmentation mask of a forefoot region of the lower extremity of the patient, and a segmentation mask of a transition region of the lower extremity of the patient. FIG. 10, which is described in greater detail below, is a flowchart that illustrates an example process for generating a composite segmentation mask.

Furthermore, as mentioned above, output unit 208 outputs segmentation mask. Output unit 208 may output a segmentation mask in one or more formats. For instance, in some examples, output unit 208 outputs a segmentation mask as an STL file for storage in memory 104, e.g., a hard disk drive of memory 104.

Figure 5:
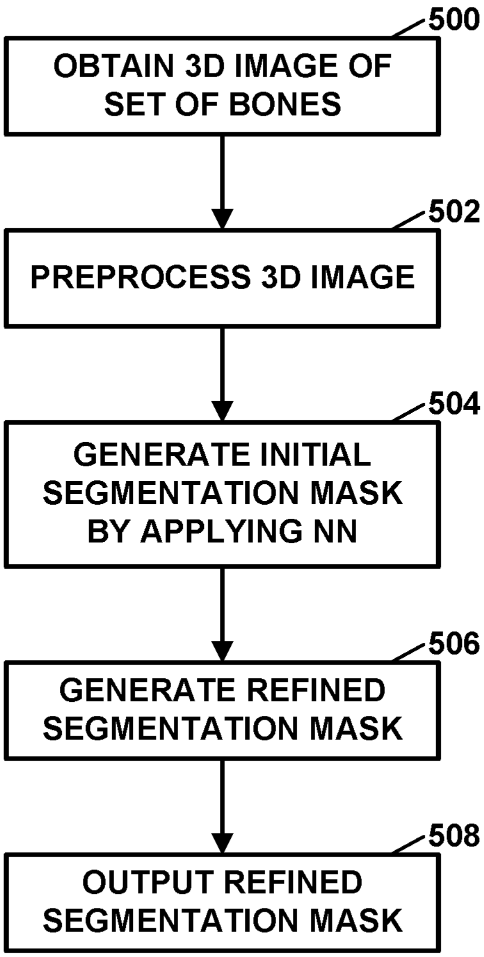
FIG. 5 is a flowchart illustrating an example segmentation process in accordance with one or more techniques of this disclosure.

FIG. 5 is a flowchart illustrating an example segmentation process in accordance with one or more techniques of this disclosure. The flowcharts of this disclosure are provided as examples. In other examples that are in accordance of this disclosure, processes may include more, fewer, or different actions or actions may be performed in different orders.

In the example of FIG. 5, segmentation system 106 may obtain a 3D image of a set of bones (500). The set of bones may include bones in a lower extremity of a patient. Segmentation system 106 may obtain the 3D image from memory 104 or from another source. Furthermore, segmentation system 106 may preprocess the 3D image (502). For instance, preprocessing unit 200 of segmentation system 106 may preprocess the 3D image as described elsewhere in this disclosure.

Additionally, in the example of FIG. 5, segmentation system 106 may generate an initial segmentation mask by applying a NN to the 3D image (504). For instance, NN unit 202 of segmentation system 106 may generate the initial segmentation mask. Segmentation system 106 may generate the initial segmentation mask in accordance with any of the examples provided in this disclosure.

Segmentation system 106 may then generate a refined segmentation mask based on the initial segmentation mask (506). For instance, refinement unit 204 of segmentation system 106 may generate the refined segmentation mask. In some examples, as part of generating the refined segmentation mask, segmentation system 106 may generate input voxel data for the 3D image. The input voxel data includes input voxel values for voxels of the 3D image. In some examples, segmentation system 106 may generate Hessian map based on the 3D mage and the input voxel data includes the Hessian map. In other words, generating the input voxels values may include generating a Hessian map. The Hessian map may be equivalent to applying a ridge filter to the 3D image. In the Hessian map, local maxima of intensity values of voxels in the 3D image are identified. Typically, the intensity values of voxels in the 3D image are greatest in the outer, cortical region of a bone. Thus, in the Hessian map, values may indicate approximate outlines of the bone. In other examples, values in the input voxel data may indicate gradient magnitudes.

Additionally, as part of generating the refined segmentation mask, segmentation system 106 may, for each respective bone of the set of bones, perform a front propagation process for the respective bone. For ease of explanation, this disclosure refers to the respective bone as the current bone. The front propagation process for the current bone attempts to determine outer boundaries of the current bone based on input voxel data, such as the Hessian map or a gradient magnitude map. In some examples, the input voxel data is considered to be a speed map. Each voxel in the speed map may indicate a speed at which the front propagation process propagates. The front propagation process for the current bone propagates a front through voxels indicated as having relatively higher speed in the speed map than voxels indicated as having relatively lower speed in the speed map.

Each voxel may be associated with an unvisited state, a considered state, or an accepted state. During an initialization phase of the front propagation process for the current bone, the front propagation process for the current bone marks each voxel identified in the initial segmentation mask as being associated with the current bone as being in the accepted state and adds the voxel to a queue. The front propagation process marks all remaining voxels as being in an unvisited state. Furthermore, during the initialization phase of the front propagation process for the current bone, the front propagation process for the current bone may set cost values for all voxels in the unvisited state to $+\infty$ and may set cost values for all voxels in the accepted state to 0.

After completing the initialization phase, the front propagation process for the bone pops a voxel from the head of the queue. The popped voxel is referred to as the current voxel. The set of voxels that are 1 voxel away from the current voxel are the neighbors of the current voxel. Thus, in some examples, the current voxel has 6 neighbors.

For each neighbor of the current voxel, the front propagation process for the current bone determines whether the neighbor is in the unvisited state, the considered state, or the accepted state. If the neighbor is in the considered state or the accepted state, the front propagation process for the current bone performs no further action with respect to the neighbor. However, if a neighbor is in the unvisited state, the front propagation process for the current bone calculates an updated cost value for the neighbor. The front propagation process for the current bone may calculate the updated cost value for the neighbor as:

$$(\max\{u-U_{i-1,j,k},\ u-U_{i+1,j,k},\ 0\})^2+$$
$$(\max\{u-U_{i,j-1,k},\ u-U_{i,j+1,k},\ 0\})^2+$$
$$(\max\{u-U_{i,j,k-1},\ u-U_{i,j,k+1},\ 0\})^2=\tilde{P}^2_{i,j,k}$$

In the equation above, (i, j, k) is the position of the neighbor, u is a value for the neighbor in the input voxel data, $U_{x,y,z}$ is the cost value for a voxel at position (x, y, z), and $$\tilde{P}^2_{i,j,k}$$

is the updated cost value for the neighbor. In the equation above positions (x, y, z) are expressed relative to position (i, j, k). In other examples, the front propagation algorithm may calculate the updated cost value in other ways.

Additionally, the front propagation process for the current bone evaluates a set of stopping conditions for the neighbor. The set of stopping conditions may include a threshold-based stopping condition. To evaluate the threshold-based stopping condition, the front propagation process for the current bone determines whether the updated cost value of the neighbor is below a specific threshold. If the updated cost value of the neighbor is below the specific threshold, the front propagation process for the current bone determines that the neighbor does not satisfy the threshold-based stopping condition. However, if the updated cost value of the neighbor is above the specific threshold, the front propagation process for the current bone determines that the neighbor satisfies the threshold-based stopping condition.

In accordance with one or more techniques of this disclosure, the set of stopping conditions may include a collision-based stopping condition. To evaluate the collision-based stopping condition, the front propagation process for the current bone determines whether the updated cost value of the neighbor is greater than a cost value of neighbor as determined by a front propagation process for a different bone. If the updated cost value of the neighbor as determined by the front propagation process for the current bone is greater than the cost of the neighbor as determined by the front propagation process for a different bone, the front propagation process for the current bone determines that the neighbor satisfies the collision-based stopping condition. Otherwise, if the updated cost value of the neighbor as determined by the front propagation process for the current bone is not greater than the cost value of the neighbor as determined by the front propagation process for a different bone, the front propagation process for the current bone determines that the neighbor does not satisfy the collision-based stopping condition. If the neighbor has not yet been evaluated by a front propagation process for a different bone, the front propagation process for the current bone may assume that the cost value determined for the neighbor by the front propagation process for the different bone is equal to $+\infty$.

For example, let X be the cost value of the neighbor as determined when the front propagation process is performed for the tibia. In this example, let Y be the cost value of the neighbor as determined when the front propagation process is performed for the talus. In this example, if the talus is the current bone, the front propagation process for the talus may determine that the neighbor satisfies the collision-based stopping condition if X is less than Y. Otherwise, the front propagation process for the talus may determine that the neighbor does not satisfy the collision-based stopping condition if X is greater than Y.

If the neighbor does not satisfy any of the stopping conditions, the front propagation process marks the neighbor as being in the accepted state. However, if the neighbor satisfies one or more of the stopping conditions, the front propagation process neighbor marks the neighbor as being in the considered state. After evaluating each of the neighbors in this way, the front propagation process for the current bone compares the updated cost values of the neighbors marked as being in the accepted state and adds the neighbors to the queue in an order of increasing cost. Thus, neighbors with lower updated cost values are added to the queue before neighbors with higher updated cost values. The front propagation process for the current bone does not add a neighbor to the queue if the neighbor is in the considered state. Because the front propagation process for the current bone does not add the neighbor to the queue if the neighbor is in the considered state, the collision-based stopping condition may stop a front of accepted-state voxels from expanding into an area that is less costly to reach from another bone than from the current bone.

After adding the accepted state neighbors to the queue, the front propagation process for the current bone pops another voxel from the head of the queue and repeats the process with the popped voxel as the current voxel. The front propagation process for the current bone may terminate when there are no remaining voxels in the queue. Thus, the voxels that are in the accepted state when the front propagation process for the current bone terminates are voxels of the 3D image reached by a front propagated by the front propagation process for the current bone. Hence, the front propagation process for the current bone may identify voxels of the 3D image reached by a front propagated by the front propagation process for the respective object, where the front starts from a voxel associated with the current bone in the initial segmentation mask. The front may be the voxels that are in the accepted state and that are at a current boundary between voxels having the accepted state and voxels having the unvisited state or the considered state.

Segmentation system 106 may update the refined segmentation mask to associate each voxel in the accepted state as being associated with the current bone. In other word, segmentation system 106 may relabel, in the refined segmentation mask, the identified voxels of the 3D image as being associated with the current bone.

Thus, in some examples, the front propagation process for the respective bone identifies voxels of the 3D image reached by a front propagated by the front propagation process for the respective bone. The front propagation process for the respective bone may relabel, in the refined segmentation mask, the identified voxels of the 3D image as being associated with the respective bone. The front propagation process for the respective bone determines a cost value for a voxel of the 3D image based on the input voxel data for the voxel and determines whether the front propagates to the voxel based on a comparison of the cost value for the voxel as determined by the front propagation process for the respective object and a cost value for the voxel as determined by the front propagation process for a different one of the bones.

Furthermore, in the example of FIG. 5, segmentation system 106 may output the refined segmentation mask (508). Segmentation system 106 may output the refined segmentation mask in accordance with any of the examples provided elsewhere in this disclosure. For instance, in some examples, segmentation system 106 may output the refined segmentation mask for display. In some examples, segmentation system 106 may output the refined segmentation mask for storage in a data storage system. In such examples, a surgical planning system may use the refined segmentation mask for automated surgical planning.

FIG. 6 is a conceptual diagram illustrating an example convolutional neural network architecture in accordance with one or more techniques of this disclosure. In the example of FIG. 6, NN 600 is implemented using a VNet algorithm. In other words, FIG. 6 shows an example VNet architecture that may be used in segmentation system 106. NN 600 has a "V" shape. A left branch of the "V" shape may be referred to as an "encoder." The encoder extracts high level features in the 3D image. A right branch of the "V" shape may be referred to as a "decoder." The decoder reconstructs information at a voxel level. An output of NN 600 is a label image at the same size as the input image. In other words, for each voxel of the input image, NN 600 outputs a corresponding label. The label of a voxel may indicate a bone to which the voxel corresponds. In some instances, the label of a voxel may indicate that the voxel corresponds to the background or to soft tissue.

In the example of FIG. 6, the encoder is composed of a succession of convolution, batch normalization and activation ("ReLU") layers at each of levels 602A-602D (collectively, "levels 602"). A transition level 604 between the levels 602 of the encoder includes a convolution with a stride of 2 which learns how to reduce the dimension of the feature maps by 2 to focus on most important features. This is denoted as "Down Cony." in FIG. 6. In the example of FIG. 6, the number of channels (filters) are defined at 16, 32, 64, 128 and 256 for the 5 levels. The convolutions at each level use a 5×5×5 filter with a stride of 1.

The decoder is symmetrically built where the "Down" convolutions are replaced by "Up" convolutions, which include doubling the size of the feature maps at each level of levels 606A-606D (collectively, "levels 606"). In some examples, NN 600 may include bridges 608 that enable connections between some high-level features that are extracted to help the reconstruction at the voxel level in the decoder.

At the end of the decoder, a 3D image with the same shape as the input image is obtained. However, the number of channels of this 3D image is defined at the number of possible classes (e.g., labels that can be assigned to voxels) in the 3D image. In one example involving an ankle region of a lower extremity of a patient, 11 classes are possible: background, distal tibia, distal fibula, calcaneus, talus, navicular, soft tissue, cuboid, lateral cuneiform, medial cuneiform and intermediate cuneiform. In another example involving a forefoot region of a lower extremity, the classes may be: background, soft tissue, cuboid, lateral cuneiform, medial cuneiform, intermediate cuneiform, first metatarsal, second metatarsal, third metatarsal, fourth metatarsal, fifth metatarsal, first proximal phalange, first distal phalange, second proximal phalange, second middle phalange, second distal phalange, third proximal phalange, third middle phalange, third distal phalange, fourth proximal phalange, fourth middle phalange, fourth distal phalange, fifth proximal phalange, fifth middle phalange, and fifth distal phalange. In an example involving a transition region of a lower extremity, the classes may be: background, soft tissue, navicular, cuboid, lateral cuneiform, medial cuneiform, intermediate cuneiform, first metatarsal, second metatarsal, third metatarsal, fourth metatarsal, fifth metatarsal, and calcaneous.

For each voxel, a likelihood probability for each class is defined through a softmax layer. An argmax layer enables NN unit 262 to determine, for each voxel, the most likely class and finally the segmentation result. In other words, for each voxel, NN unit 262 associates the voxel with the most-probable label generated by NN 600 for the voxel.

A voxel corresponding to background may have a lower weight than a voxel corresponding to the distal fibula for example. The weight for each class is computed based on the training dataset. These weights correspond then to a mean value for each class. The sum of all the weights is 1. During training, these weights are applied for each image to compute the loss. Some metrics such as the global accuracy, class accuracies, Jaccard index (known as intersection over union) or dice coefficient are defined to monitor the training. The weights of the neurons are initialized using a Xavier initializer. Table 1 shows an example voxel composition of an example dataset used for training.

TABLE 1

| | |
|---|---|
| Background | 66.3 |
| Distal tibia | 2.09 |
| Distal fibula | 0.58 |
| Calcaneus | 2.47 |
| Talus | 1.42 |
| Navicular | 0.37 |
| Soft tissue | 25.87 |
| Cuboid | 0.38 |
| Medial cuneiform | 0.27 |
| Intermediate cuneiform | 0.1 |
| Lateral cuneiform | 0.15 |

In some circumstances, the initial segmentation mask generated by the NN may be inaccurate around bone boundaries. Therefore, segmentation system 106 may perform a refinement process to refine the initial segmentation mask. An objective of the refinement process is to generate a refined segmentation mask that has the same size and resolution as the initial 3D image (e.g., an initial CT scan), to correct as much as possible the segmentation inaccuracies along the bone boundaries, and to segment the tibia and fibula diaphyses.

Figure 7:
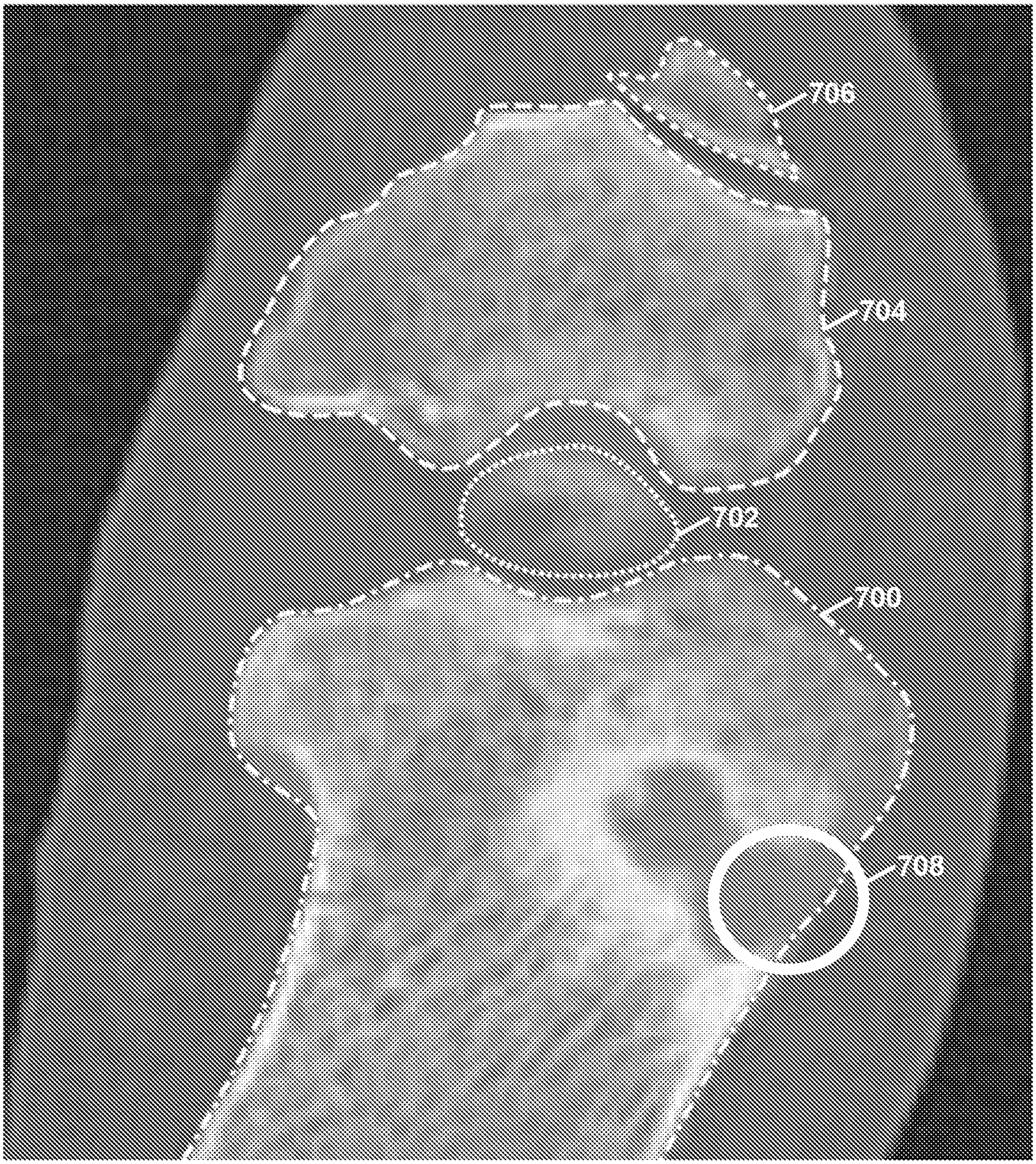
FIG. 7 is a conceptual diagram illustrating an example of an initial segmentation mask.
Figure 8:
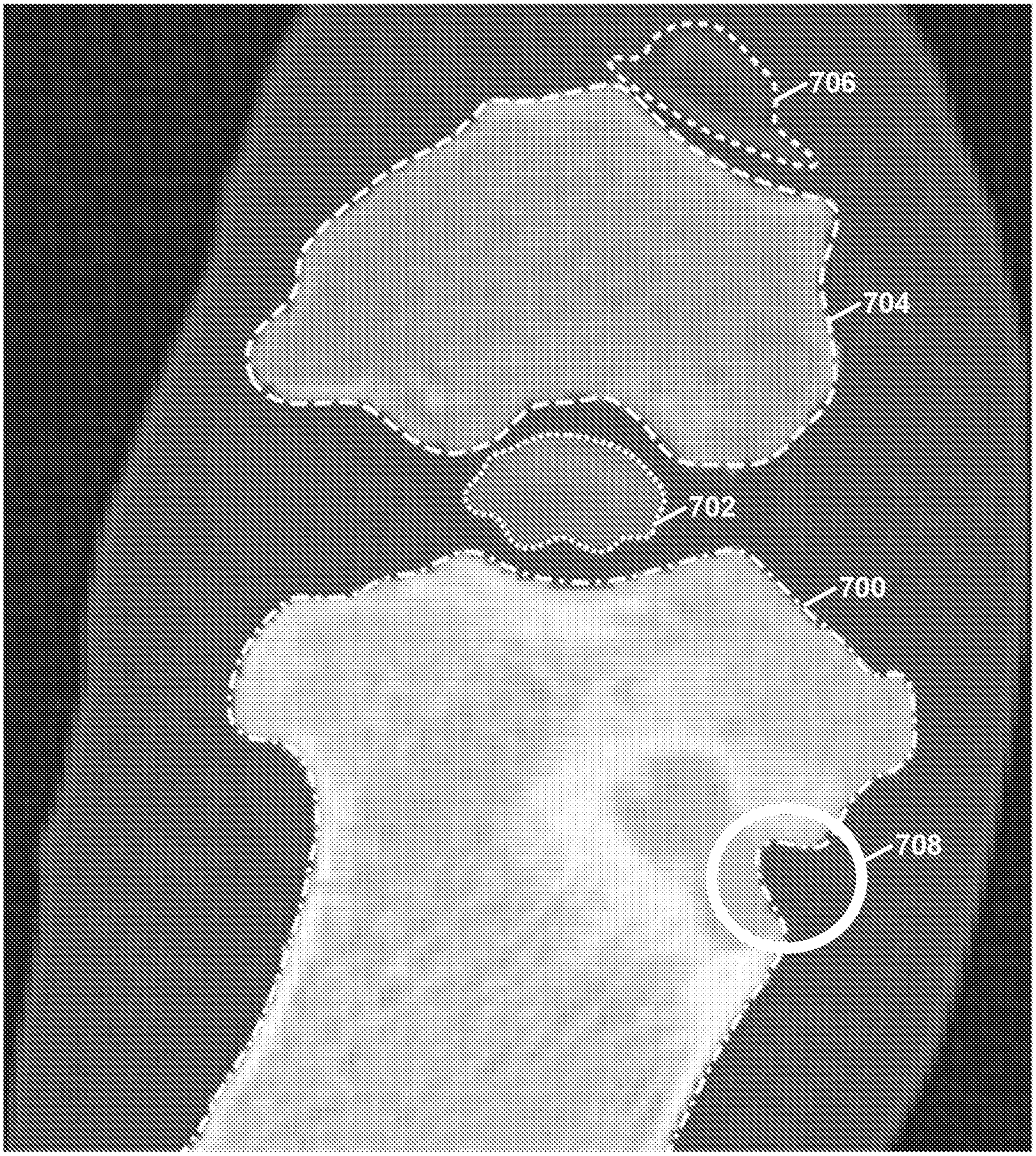
FIG. 8 is a conceptual diagram illustrating an example of a refined segmentation mask.

FIG. 7 is a conceptual diagram illustrating an example initial segmentation mask. More specifically, FIG. 7 illustrates an example VNET segmentation that may be generated by NN 600 (FIG. 6). FIG. 8 is a conceptual diagram illustrating an example refined segmentation mask. In other words, FIG. 8 illustrates how the refinement process enhances the VNET segmentation. FIG. 7 and FIG. 8 focus on a specific area of a CT scan with respectively the segmentation mask before and after applying the postprocessing overlaid on top. In FIG. 7 and FIG. 8, reference number 700 corresponds to calcaneus, reference number 702 corresponds to the talus, reference number 704 corresponds to the navicular bone, and reference number 706 corresponds to the intermediate cuneiform bone. One can see in FIG. 7 that the VNET segmentation is satisfying in overall result but has a tendency to over-segment in places, such as the area marked with circle 708. Joint surfaces are often segmented as is the case in FIG. 7 between the navicular bone 704 and talus 702. FIG. 8 shows how the postprocessing algorithm may improve the segmentation to better fit the bone boundaries.

FIG. 9 is a flowchart illustrating an example segmentation refinement process in accordance with one or more techniques of this disclosure. Although the example of FIG. 9 is explained with reference to FIG. 1 and FIG. 2, the segmentation refinement process of FIG. 9 may be performed with respect to other systems and sets of components. In the example of FIG. 9, refinement unit 204 may resample the initial segmentation mask to match a resolution of the original 3D image, such as an original CT scan (900).

Additionally, in the example of FIG. 9, refinement unit 204 may generate input voxel data (902). The input voxel data includes input voxel values for voxels in the 3D image. For example, refinement unit 204 may generate a Hessian map based on the 3D image. The input voxel data may include the Hessian map. The Hessian map (i.e., a Hessian matrix) is a matrix of second-order partial derivatives of a scalar field. In the context of this disclosure, the scalar field may be the intensity values of voxels in the 3D image.

After generating the input voxel data, refinement unit 204 may perform a first erosion process (904). As discussed elsewhere in this disclosure (and shown in the example of FIG. 7, bones may be over-segmented in the initial segmentation mask. In other words, the initial segmentation mask may indicate that certain voxels correspond to bones when those voxels do not actually correspond to the bones. The first erosion process may reduce over-segmentation in the initial segmentation mask by "eroding" the edges of areas in the initial segmentation mask identified as corresponding to bone. In some examples, to perform the first erosion process, refinement unit 204 may identify boundary voxels of the initial segmentation mask. A boundary voxel is a voxel that is labeled in a segmentation mask as being part of a bone that has at least one neighbor voxel that is labeled in the segmentation mask as being soft tissue, background, or part of a different bone. Next, for each of the identified boundary voxels, refinement unit 204 may identify neighbor voxels that are within a predetermined spacing radius of the boundary voxel. In some examples, resolution of the 3D image is less along the Z-axis of the 3D image than along the X-axis or Y-axis of the 3D image. In such examples, the predetermined spacing radius may be a 2×X-spacing radius. In such examples, X denotes a Z-axis resolution factor for the 3D image. X may be determined such that the identified boundary voxels form a sphere around the current boundary voxel. Furthermore, for each identified neighbor voxel, refinement unit 204 may relabel the identified neighbor voxel as soft tissue if an intensity value of the identified neighbor voxel is less than a first threshold and a value for the identified neighbor voxel in the input voxel data is less than a second threshold. In some examples, the first threshold is 226 Hounsfield units (HU) or another value. In some examples where the input voxel data is a Hessian map, the second threshold is 20 or another value.

Furthermore, in the example of FIG. 9, refinement unit 204 may perform an opening process (906). The opening process may disconnect undesired voxels from bones and remove small voxel clusters that were created by performing the first erosion process. In other words, because the first erosion process relabels some voxels from bone to soft tissue based on thresholds, the first erosion process may leave isolated clusters of voxels that are still labeled as bone even though they are separated from a main group of voxels that are labeled as bone. To perform the opening process, refinement unit 204 may again identify the boundary voxels. For each identified boundary voxel, refinement unit 204 may relabel each voxel that neighbors the boundary voxel as being bone. Thus, by performing the opening process, the bone may be dilated by (e.g., one or more) voxels in all directions. In this way, refinement unit 204 may expand the areas associated with bone in the refined segmentation mask. Performing this opening process may reconnect isolated clusters of voxels that were labeled as bone to larger clusters of voxels that were labeled as bone.

Next, in the example of FIG. 9, refinement unit 204 may perform a recovery process to recover wrongly removed cortical bone in the segmentation mask (908). It is observed that some cortical bone may be so thin that refinement unit 204 relabels voxels corresponding to marrow bone as corresponding to soft tissue when performing the first erosion process. To perform the recovery process, refinement unit 204 may perform a first front propagation process for each of the bones. The for front propagation process for a bone uses the input voxel data to address this issue by recovering missing cortical bone.

When performing the first front propagation process for a bone, refinement unit 204 may use the input voxel data, e.g., a Hessian map, to relabel, in the refined segmentation mask, voxels of the 3D image as being associated with the respective bone. A stopping condition of a path evaluated by the front propagation process for the respective bone occurs based on a comparison of a cost value for the voxel as determined by the front propagation process for the bone and a cost value for the voxel as determined by the front propagation process for a different one of the bones. For instance, the front propagation process for the bone may determine that the front does not propagate to the voxel when the cost value for the voxel as determined by the front propagation process for the bone is greater than the cost value for the voxel as determined by the front propagation process for a different one of the bones. By using this stopping condition, the front propagation process for the bone will not "leak into" another bone (i.e., start relabeling voxels of another bone as being part of the bone).

Additionally, in the example of FIG. 9, refinement unit 204 may perform a closing process (910). The closing process may serve to recover marrow bone voxels that were relabeled as soft tissue voxels in the first erosion process. To perform the closing process, refinement unit 204 may relabel each voxel that is within a specific number of voxels (e.g., 2 voxels) of a boundary voxel as having the same label as the boundary voxel. Thus, when performing the closing process, refinement unit 204 may relabel each voxel within a specific radius of a voxel labeled in the refined segmentation mask as being part of a bone.

After performing the closing process, refinement unit 204 may perform a second erosion process (912). The second erosion process may remove mislabeled voxels that are close to initial bone boundaries. Refinement unit 204 may perform the second erosion process in the same way as the first erosion process. However, in some examples, when performing the second erosion process, refinement unit 204 may use different values for the first threshold and the second threshold. Thus, after performing the closing process, refinement unit 204 may perform a second erosion process that associates, in the refined segmentation mask, voxels of the 3D image having intensity values below a third threshold and values in the input voxel data below a fourth threshold with soft tissue.

In the example of FIG. 9, refinement unit 204 may then perform a process to add missing cortical bone to the segmentation mask (914). In some instances, after performing the second erosion process, there may still be voxels that correspond to cortical bone but are not labeled as bone in the segmentation mask. When performing the process to add missing cortical bone to the segmentation mask, refinement unit 204 may again perform a second front propagation process for each of the bones. Refinement unit 204 may perform the second front propagation process for a bone in the same manner as the front propagation processes described elsewhere in this disclosure. However, instead of using, e.g., a Hessian map, as the input voxel data to determine cost values of voxels, the second front propagation process uses an intensity map as the input voxel data to determine the cost values of the voxels. The intensity map may be a filtered version of the 3D image in which voxels that are below a particular threshold, such as 350 Hounsfield units, are set to 0. As a result, the second front propagation process does not typically propagate into soft tissue (i.e., the second front propagation process does not typically incorrectly relabel voxels from soft tissue from bone).

Thus, in this example, for each respective bone of the set of bones, refinement unit 204 may perform a second front propagation process for the respective bone. The second front propagation process for the respective bone uses the input voxel data to relabel, in the refined segmentation mask, voxels of 3D image as being associated with the respective bone. In this example, the second front propagation process for the respective bone determines a second cost value for a second voxel of the 3D image based on an intensity map value for the second voxel. Refinement unit 204 determines that a second front propagated by the second front propagation process for the respective object does not propagate to the second based on either a first stopping condition or a second stopping condition occurring. The stopping condition occurs when the second cost value for the second voxel as determined by the second front propagation process for the respective bone is greater than a cost value for the second voxel as determined by a second front propagation process for a different one of the bones.

Segmentation may be especially valuable in total ankle replacement (TAR) surgery. Typically, TAR surgery does not involve the cuneiform bones or cuboid bones. However, cuneiform bones and the cuboid bone frequently appear in 3D medical images of the lower extremities of patients. The cuneiform bones and cuboid bone of a patient are typically very close to bones of the patient that are involved in a TAR surgery, such as the navicular bone and the calcaneus. Because the cuneiform bones and cuboid bones are so close to the navicular bone and calcaneus, a front propagation process to segment the navicular bone or the calcaneus may leak into the cuneiform bones or cuboid bone, resulting in a segmentation mask in which one or more of the cuneiform bones are labeled as being part of the navicular bone or the cuboid bone is labeled as being part of the calcaneus. However, because voxels corresponding to the cuneiform bones and cuboid bone are labeled in the initial segmentation mask generated by the NN, and, in accordance with a technique of this disclosure, a stopping condition of the front propagation process for a bone (e.g., the navicular bone or calcaneus) is reaching a voxel having a cost value greater than a cost value determined by a front propagation process for a different bone, the front propagation process for the bone does not leak into the other bone (e.g., cuneiform bones or cuboid bone).

Furthermore, in the example of FIG. 9, refinement unit 204 may perform segmentation of tibia and fibula diaphyses (916). As noted above with respect to FIG. 4, an initial 3D image may be restricted to box 400 for purposes of generating input to the NN. The diaphyses of distal tibia 402 and distal fibula 404 are outside of box 400. Hence, the initial segmentation mask (and the refined segmentation mask generated so far in the refinement operation of FIG. 9) does not include labels for voxels corresponding to portions of distal tibia 402 and distal fibula 404 that are outside of box 400. Therefore, refinement unit 204 may perform segmentation of the tibia and fibula diaphyses based on the original 3D image to include the tibia and fibula diaphyses in the refined segmentation mask.

To perform segmentation of the tibia and fibula diaphyses, refinement unit 204 may perform front propagation processes for each of the tibia and the fibula. When performing the front propagation process for the tibia, refinement unit 204 may start the front propagation process from a voxel labeled in the refined segmentation mask as being part of the tibia. When performing the front propagation process for the fibula, refinement unit 204 may start the front propagation process from a voxel labeled in the refined segmentation mask as being part of the fibula. Initially excluding the tibia and fibula diaphyses when generating the initial segmentation mask may simplify a NN used by NN unit 202 because the input matrix for the NN may be smaller. Moreover, because the tibia and fibula diaphyses typically have sufficient separation from each other, it is unlikely that the front propagation process for the distal tibia will leak into the distal fibula, or vice versa. The front propagation processes for the tibia and fibula may use intensity values in the region of the 3D image outside of the bounding box to determine cost values for the voxels of the 3D image.

Thus, in some examples, preprocessing unit 200 (FIG. 2) may crop the 3D image to exclude a region of the 3D image outside of a bounding box. In such examples, the region of the 3D image outside of the bounding box includes voxels corresponding to a portion of a distal tibia of the patient and a portion of a distal fibula of the patient. Furthermore, in such examples, as part of generating the refined segmentation mask, refinement unit 204 may perform a front propagation process for the distal tibia starting from a voxel labeled in the refined segmentation mask as being part of the distal tibia. Additionally, refinement unit 204 may perform a front propagation process for the distal fibula starting from a voxel labeled in the refined segmentation mask as being part of the distal fibula. The front propagation process for the distal tibia and the distal fibula may use intensity values in the region of the 3D image outside of the bounding box to determine cost values for the voxels, input voxel data for the region of the 3D image outside of the bounding box, and/or other data. In other words, the front propagation process for the distal tibia and the distal fibula may use intensity values in the region of the 3D image outside of the bounding box, input voxel data for the region of the 3D image outside of the bounding box, and/or other data as input voxel data.

In the example of FIG. 9, after performing segmentation of the tibia and fibula diaphyses, refinement unit 204 may perform postprocessing on the refined segmentation mask (918). For example, as part of performing postprocessing on the refined segmentation mask, refinement unit 204 may increase the resolution of the refined segmentation mask. For instance, in this example, refinement unit 204 may increase the resolution of the refined segmentation mask by a factor of 3 (or another factor) so that the refined segmentation mask has a resolution that matches the resolution of the initial 3D image.

Furthermore, in some examples, as part of performing postprocessing on the refined segmentation mask, refinement unit 204 may use a marching cube algorithm to build a 3D model for each bone based on the refined segmentation mask. For each of the bones, the 3D model of the bones may comprise a mesh of triangles (or other types of polygons) that correspond to the surface of the bone.

FIG. 10 is a flowchart illustrating an example process for generating a composite segmentation mask in accordance with one or more techniques of this disclosure. As noted above, there may be instances in which it may be difficult for a computing system to efficiently perform a segmentation process because of constraints on storage resources or computing resources. The process of FIG. 10 may address such issues. Although the example of FIG. 10 is explained with reference to FIG. 1 and FIG. 2, the segmentation refinement process of FIG. 10 may be performed with respect to other systems and sets of components.

In the example of FIG. 10, compositing unit 206 of segmentation system 106 may partition a 3D image of a lower extremity of a patient into an ankle region, a forefoot region, and a transition region (1000). By partitioning the 3D image, compositing unit 206 may generate a 3D image of an ankle region of the lower extremity, a 3D image of a forefoot region of the lower extremity, and a 3D image of a transition region of the lower extremity. The ankle region of the lower extremity may include bones such as the distal tibia, distal fibula, talus, calcaneus, and navicular. The forefoot region of the lower extremity may include the metatarsals and phalanges. The transition region may include the cuneiform bones and cuboid bone. There may be some overlap between the regions. For instance, the ankle region may include all or some of the cuneiform bones and/or cuboid bone. Likewise, the forefoot region may include all or some of the cuneiform bones and/or cuboid bone. In some examples, compositing unit 206 may partition the 3D image in response to user input that specifies approximate locations within the 3D image of the cuneiform bones and cuboid bone of the lower extremity. In such examples, compositing unit 206 may receive indications of user input to select a center of the ankle region and a center of the forefoot region. In such examples, compositing unit 206 may partition the 3D image using bounding boxes defined based on the selected center of the ankle region, the selected center of the forefoot region, and a point between the selected center of the ankle region and the selected center of the forefoot region. In other examples, compositing unit 206 may automatically detect the center of the ankle region and the center of the forefoot region, and use a similar bounding box technique.

After compositing unit 206 partitions the 3D image, compositing unit 206 may perform a segmentation process on the 3D image of the ankle region (1002), i.e., a first segmentation process. Compositing unit 206 may perform (or request other units of segmentation system 106 to perform) the operation of FIG. 5 and/or other examples of this disclosure to perform the first segmentation process. In other examples, compositing unit 206 may use a different set of steps to perform the first segmentation process. By performing the first segmentation process, compositing unit 206 may generate a first segmentation mask that includes data that label voxels as being associated with particular bones, such as the distal tibia, distal fibula, talus, calcaneus, navicular, and/or other bones.

Furthermore, in the example of FIG. 10, compositing unit 206 may perform a segmentation process on the 3D image of the forefoot region (1004), i.e., a second segmentation process. Compositing unit 206 may perform (or request other units of segmentation system 106 to perform) the operation of FIG. 5 and/or other examples of this disclosure to perform the second segmentation process. In other examples, compositing unit 206 may use a different set of steps to perform the second segmentation process. By performing the second segmentation process, compositing unit 206 may generate a second segmentation mask that includes data that label voxels as being associated with particular bones, such as the metatarsals, phalanges, and/or other bones.

Compositing unit 206 may perform a segmentation process on the 3D image of the transition region (1006), i.e., a third segmentation process. Compositing unit 206 may perform (or request other units of segmentation system 106 to perform) the operation of FIG. 5 and/or other examples of this disclosure to perform the third segmentation process. In other examples, compositing unit 206 may use a different set of steps to perform the third segmentation process. By performing the third segmentation process, compositing unit 206 may generate a third segmentation mask that includes data that label voxels as being associated with particular bones, such as the cuneiform bones, cuboid bone, and/or other bones.

When performing the first, second, and third segmentation processes, compositing unit 206 may use different NNs to generate respective initial segmentation masks. The different NNs may have differently sized input arrays, different numbers of layers, different hyperparameters, and so on. A first one of the NNs for the first segmentation process may be trained to recognize bones in the ankle region, a second one of the NNs for the second segmentation process may be trained to recognize bones in the forefoot region, and a third one of the NNs for the third segmentation process may be trained to recognize bones in the transition region. Although the total number of weights and other parameters in the first, second, and third NNs together may be greater than a total number of weights or other parameters in a single NN for segmenting an entire lower extremity, a total number of weights that may be need to be loaded at any one time may be less. This may result in faster overall execution. Moreover, it may take less time overall to train the three separate NNs than one large NN because the number of input voxels, output labels, and potential labels for the three separate NNs may be less.

After performing the first, second, and third segmentation processes, compositing unit 206 may generate a composite segmentation mask of the lower extremity of the patient based on the segmentation masks of the ankle region, forefoot region, and transition region (1008). The composite segmentation mask includes data that associate voxels of the original 3D image of the lower extremity with the distal tibia, distal fibula, talus, calcaneus, navicular, cuneiform bones, cuboid, metatarsals, and phalanges.

To generate the composite segmentation mask, compositing unit 206 may align the first, second, and third segmentation masks. Compositing unit 206 may use coordinates preserved from partitioning the 3D image of the lower extremity to align the first, second, and third segmentation masks. Additionally, compositing unit 206 may discard labels from the first segmentation mask that associate voxels with the cuneiform bones and cuboid bone. Similarly, compositing unit 206 may discard labels from the second segmentation mask that associate voxels with the cuneiform bones and cuboid bone. Compositing unit 206 may discard labels from the third segmentation mask that associate voxels with bones other than the cuneiform bones and cuboid bone. The remaining labels form the composite segmentation mask.

Thus, in the example of FIG. 10, as part of partitioning the 3D image of the lower extremity, compositing unit 206 may partition the 3D image of the lower extremity such that cuneiform bones of the lower extremity are partially in the 3D image of the ankle region, partially in the 3D image of the forefoot region, and entirely in the 3D image of the transition region. In this example, compositing unit 206 may composite the first segmentation mask, the second segmentation mask, and the third segmentation mask using voxels associated with the cuneiform bones in the third segmentation mask in a fourth, composite segmentation mask and not using any labels associated with the cuneiforms bones in the first and second segmentation masks in the fourth segmentation mask.

In some examples, compositing unit 206 may output the composite segmentation mask for display. In some examples, compositing unit 206 may output the composite segmentation mask to storage at a data storage system. The composite segmentation mask may be used by a human or computer to support planning, guidance, classification, recommendation, selection, manufacture, positioning, or other perform of activities. For instance, in some examples, the composite segmentation mask may be used for planning a cut in the bone. In some examples, the composite segmentation mask may be used in the design of patient-specific instruments.

The following is a non-limiting list of examples that may be in accordance with one or more techniques of this disclosure.

Example 1: A method for performing computerized segmentation of 3-dimensional images includes obtaining, by a computing system, a 3-dimensional (3D) image of a set of objects; generating, by the computing system, an initial segmentation mask by applying a neural network to the 3D image, wherein the initial segmentation mask includes data that associate voxels of the 3D image with individual objects of the set of objects; generating, by the computing system, a refined segmentation mask based on the initial segmentation mask, wherein generating the refined segmentation mask comprises: generating input voxel values for voxels in the 3D image; and for each respective object of the set of objects, performing, by the computing system, a front propagation process for the respective object, wherein performing the front propagation process for the respective object comprises: identifying voxels of the 3D image reached by a front propagated by the front propagation process for the respective object, wherein the front starts from a voxel associated with the respective bone in the initial segmentation mask; and relabeling, in the refined segmentation mask, the identified voxels of the 3D image as being associated with the respective object, wherein the front propagation process for the respective object determines a cost value for a voxel of the 3D image based on an input voxel data value for the voxel and determines whether the front propagates to the voxel based on a comparison of the cost value for the voxel as determined by the front propagation process for the respective object and a cost value for the voxel as determined by the front propagation process for a different one of the objects; and outputting, by the computing system, the refined segmentation mask.

Example 2: The method of example 1, wherein generating the refined segmentation mask further comprises, prior to performing the front propagation process for the objects: performing an erosion process that associates, in the refined segmentation mask, voxels of the 3D image having intensity values below a first threshold and input voxel values below a second threshold with soft tissue; and after performing the erosion process, performing an opening process that expands areas associated with object in the refined segmentation mask.

Example 3: The method of example 1 or example 2, wherein generating the refined segmentation mask further comprises, after performing the front propagation process for each of the objects: performing a closing process that relabels each voxel within a specific radius of a voxel labeled in the refined segmentation mask as being part of an object; and after performing the closing process, performing a second erosion process that associates, in the refined segmentation mask, voxels of the 3D image having intensity values below a third threshold and input voxel values below a fourth threshold with soft tissue.

Example 4: The method of example 3, wherein generating the refined segmentation mask further comprises, after performing the closing process: for each respective object of the set of objects, performing, by the computing system, a second front propagation process for the respective object, wherein the second front propagation process for the respective object uses the input voxel data to relabel, in the refined segmentation mask, voxels of the 3D image as being associated with the respective object, wherein the second front propagation process for the respective object determines a second cost value for a second voxel of the 3D image based on an intensity map value for the second voxel, and determines that a second front propagated by the second front propagation process for the respective object does not propagate to the second based on either a stopping condition occurring, wherein the first stopping condition occurs when the second cost value for the second voxel as determined by the second front propagation process for the respective object is greater than a cost value for the second voxel as determined by a second front propagation process for a different one of the objects.

Example 5: The method of any of examples 1-3, wherein the set of objects is a set of bones.

Example 6: The method of example 5, wherein: the method further comprises cropping the 3D image to exclude a region of the 3D image outside of a bounding box, wherein the region of the 3D image outside of the bounding box includes voxels corresponding to a portion of a distal tibia of the patient and a portion of a distal fibula of the patient, generating the refined segmentation mask further comprises: performing a front propagation process for the distal tibia starting from a voxel labeled in the refined segmentation mask as being part of the distal tibia, wherein the third front propagation process for the distal tibia uses intensity values in the region of the 3D image outside of the bounding box to determine third cost values for the voxels of the 3D image; and performing a front propagation process for the distal fibula starting from a voxel labeled in the refined segmentation mask as being part of the distal fibula, wherein the third front propagation process for the distal fibula uses intensity values in the region of the 3D image outside of the bounding box to determine fourth cost values for the voxels of the 3D image.

Example 7: The method of any of examples 5 or 6, wherein the set of bones includes two or more of: distal tibia, a distal fibula, a talus, a calcaneus, a navicular bone, one or more cuneiform bones, a cuboid bone, one or more metatarsals, or one or more phalanges bones.

Example 8: The method of any of examples 1-7, wherein generating the input voxel values comprises generating, by the computing system, a Hessian map based on the 3D image.

Example 9: A method for performing computerized segmentation of 3-dimensional (3D) medical images of lower extremities of patients includes partitioning, by a computing system, a 3D image of a set of bones in a lower extremity of a patient into a 3D image of an ankle region of the lower extremity of the patient, a 3D image of a forefoot region of the lower extremity of the patient, and a 3D image of a transition region of the lower extremity of the patient; performing, by the computing system, a first segmentation process that generates a first segmentation mask based on the 3D image of the ankle region; performing, by the computing system, a second segmentation process that generates a second segmentation mask based on the 3D image of the forefoot region; performing, by the computing system, a third segmentation process that generates a third segmentation mask based on the 3D image of the transition region; and compositing the first segmentation mask, the second segmentation mask, and the third segmentation mask to generate a fourth segmentation mask.

Example 10: The method of example 8, wherein: partitioning the 3D image of the lower extremity comprises partitioning the 3D image of the lower extremity such that cuneiform bones of the lower extremity are partially in the 3D image of the ankle region, partially in the 3D image of the forefoot region, and entirely in the 3D image of the transition region, and compositing the first segmentation mask, the second segmentation mask, and the third segmentation mask comprises using voxels associated with the cuneiform bones in the third segmentation mask in the fourth segmentation mask and not using any labels associated with the cuneiforms bones in the first and second segmentation masks in the fourth segmentation mask.

Example 11: The method of any of examples 8-9, wherein at least one of: performing the first segmentation process comprises performing the methods of any of examples 1-8, performing the second segmentation process comprises performing the methods of any of examples 1-8, or performing the third segmentation process comprises performing the methods of any of examples 1-8.

Example 12: A computing system includes memory storing a 3-dimensional image of a set of objects; and processing circuitry configured to perform the methods of any of claims 1-11.

Example 13: A computing system comprising means for performing the methods of any of examples 1-11.

Example 14: A computer-readable storage medium having stored thereon that, when executed, cause processors to perform the methods of any of examples 1-11.

While the techniques been disclosed with respect to a limited number of examples, those skilled in the art, having the benefit of this disclosure, will appreciate numerous modifications and variations there from. For instance, it is contemplated that any reasonable combination of the described examples may be performed. It is intended that the appended claims cover such modifications and variations as fall within the true spirit and scope of the invention.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Operations described in this disclosure may be performed by one or more processors, which may be implemented as fixed-function processing circuits, programmable circuits, or combinations thereof, such as one or more digital signal processors (DSPs), general purpose microprocessors, application specific integrated circuits (ASICs), field programmable gate arrays (FPGAs), or other equivalent integrated or discrete logic circuitry. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute instructions specified by software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. Accordingly, the terms "processor" and "processing circuitry," as used herein may refer to any of the foregoing structures or any other structure suitable for implementation of the techniques described herein.

Various examples have been described. These and other examples are within the scope of the following claims.

The invention claimed is:

1. A method for performing computerized segmentation of 3-dimensional (3D) medical images of lower extremities of patients, the method comprising:

partitioning, by a computing system, a 3D image of a set of bones in a lower extremity of a patient into a 3D image of an ankle region of the lower extremity of the patient, a 3D image of a forefoot region of the lower extremity of the patient, and a 3D image of a transition region of the lower extremity of the patient;

performing, by the computing system, a first segmentation process that generates a first segmentation mask based on the 3D image of the ankle region, wherein performing the first segmentation process comprises applying a first neural network trained to recognize bones in the ankle region, and applying the first neural network comprises loading a first set of weights into a memory at a first time;

performing, by the computing system, a second segmentation process that generates a second segmentation mask based on the 3D image of the forefoot region, wherein performing the second segmentation process comprises applying a second neural network trained to recognize bones in the forefoot region, and applying the second neural network comprises loading a second set of weights into the memory at a second time different from the first time;

performing, by the computing system, a third segmentation process that generates a third segmentation mask based on the 3D image of the transition region, wherein performing the third segmentation process comprises applying a third neural network trained to recognize bones in the transition region, and applying the third neural network comprises loading a third set of weights into the memory at a third time different from the first time and the second time;

compositing, by the computing system, the first segmentation mask, the second segmentation mask, and the third segmentation mask to generate a fourth segmentation mask; and outputting, by the computing system, the fourth segmentation mask for display.

2. The method of claim 1, wherein:

partitioning the 3D image of the set of bones comprises partitioning the 3D image of the set of bones in the lower extremity such that cuneiform bones of the lower extremity are partially in the 3D image of the ankle region, partially in the 3D image of the forefoot region, and entirely in the 3D image of the transition region, and compositing the first segmentation mask, the second segmentation mask, and the third segmentation mask comprises using voxels associated with the cuneiform bones in the third segmentation mask in the fourth segmentation mask and not using any labels associated with the cuneiform bones in the first and second segmentation masks in the fourth segmentation mask.

3. The method of claim 1, wherein at least one of performing the first segmentation process, performing the second segmentation process, or performing the third segmentation process comprises:

generating, by the computing system, an initial segmentation mask by applying a neural network to an applicable 3D image, wherein the applicable 3D image is one of the 3D image of the ankle region, the 3D image of the forefoot region, or the 3D image of the transition region, and the initial segmentation mask includes data that associate voxels of the applicable 3D image with individual bones of an applicable set of bones;

generating, by the computing system, a refined segmentation mask based on the initial segmentation mask, wherein generating the refined segmentation mask comprises:

generating input voxel values for voxels in the applicable 3D image; and for each respective bone of the applicable set of bones, performing, by the computing system, a front propagation process for the respective bone, wherein performing the front propagation process for the respective bone comprises:

identifying voxels of the applicable 3D image reached by a front propagated by the front propagation process for the respective bone, wherein the front starts from an initial voxel associated with the respective bone in the initial segmentation mask; and relabeling, in the refined segmentation mask, the identified voxels of the applicable 3D image as being associated with the respective bone, wherein the front propagation process for the respective bone determines a first cost value for a current voxel of the applicable 3D image based on an input voxel data value for the current voxel and determines whether the front propagates to the current voxel based on a comparison of the first cost value for the current voxel as determined by the front propagation process for the respective bone and a second cost value for the current voxel as determined by the front propagation process for a different individual bone of the applicable set of bones; and outputting, by the computing system, the refined segmentation mask.

4. A computing system comprising:

memory storing a 3-dimensional (3D) image of a set of bones in a lower extremity of a patient; and processing circuitry configured to:

partition the 3D image of the set of bones of a patient into a 3D image of an ankle region of the lower extremity of the patient, a 3D image of a forefoot region of the lower extremity of the patient, and a 3D image of a transition region of the lower extremity of the patient;

perform a first segmentation process that generates a first segmentation mask based on the 3D image of the ankle region, wherein to perform the first segmentation process, the processing circuitry is configured to apply a first neural network trained to recognize bones in the ankle region, and applying the first neural network comprises loading a first set of weights into a memory at a first time;

perform a second segmentation process that generates a second segmentation mask based on the 3D image of the forefoot region, wherein to perform the second segmentation process, the processing circuitry is configured to apply a second neural network trained to recognize bones in the forefoot region, and applying the second neural network comprises loading a second set of weights into the memory at a second time different from the first time;

perform a third segmentation process that generates a third segmentation mask based on the 3D image of the transition region, wherein to perform the third segmentation process, the processing circuitry is configured to apply a third neural network trained to recognize bones in the transition region, and applying the third neural network comprises loading a third set of weights into the memory at a third time different from the first time and the second time;

composite the first segmentation mask, the second segmentation mask, and the third segmentation mask to generate a fourth segmentation mask; and output the fourth segmentation mask for display.

5. The computing system of claim 4, wherein:

the processing circuitry is configured to, as part of partitioning the 3D image of the set of bones, partition the 3D image of the set of bones in the lower extremity such that cuneiform bones of the lower extremity are partially in the 3D image of the ankle region, partially in the 3D image of the forefoot region, and entirely in the 3D image of the transition region, and the processing circuitry is configured to, as part of compositing the first segmentation mask, the second segmentation mask, and the third segmentation mask, use voxels associated with the cuneiform bones in the third segmentation mask in the fourth segmentation mask and not use any labels associated with the cuneiform bones in the first and second segmentation masks in the fourth segmentation mask.

6. The computing system of claim 4, wherein to perform at least one of the first segmentation process, the second segmentation process, or the third segmentation process, the processing circuitry is configured to:

generate an initial segmentation mask by applying a neural network to an applicable 3D image, wherein the applicable 3D image is one of the 3D image of the ankle region, the 3D image of the forefoot region, or the 3D image of the transition region, and the initial segmentation mask includes data that associate voxels of the applicable 3D image with individual bones of an applicable set of bones;

generate a refined segmentation mask based on the initial segmentation mask, wherein the processing circuitry is configured to, as at least part of generating the refined segmentation mask:

generate input voxel values for voxels in the applicable 3D image; and for each respective bone of the applicable set of bones, perform a front propagation process for the respective bone, wherein performing the front propagation process for the respective bone comprises:

identifying voxels of the applicable 3D image reached by a front propagated by the front propagation process for the respective bone, wherein the front starts from an initial voxel associated with the respective bone in the initial segmentation mask; and relabeling, in the refined segmentation mask, the identified voxels of the applicable 3D image as being associated with the respective bone, wherein the front propagation process for the respective bone determines a first cost value for a current voxel of the applicable 3D image based on an input voxel data value for the current voxel and determines whether the front propagates to the current voxel based on a comparison of the first cost value for the current voxel as determined by the front propagation process for the respective bone and a second cost value for the current voxel as determined by the front propagation process for a different individual bone of the applicable set of bones; and output the refined segmentation mask.

7. A non-transitory computer-readable storage medium having instructions stored thereon that, when executed by processing circuitry, cause the processing circuitry to:

partition a 3-dimensional (3D) image of a set of bones in a lower extremity of a patient into a 3D image of an ankle region of the lower extremity of the patient, a 3D image of a forefoot region of the lower extremity of the patient, and a 3D image of a transition region of the lower extremity of the patient;

perform a first segmentation process that generates a first segmentation mask based on the 3D image of the ankle region, wherein performing the first segmentation process comprises applying a first neural network trained to recognize bones in the ankle region, and applying the first neural network comprises loading a first set of weights into a memory at a first time;

perform a second segmentation process that generates a second segmentation mask based on the 3D image of the forefoot region, wherein performing the second segmentation process comprises applying a second neural network trained to recognize bones in the forefoot region, and applying the second neural network comprises loading a second set of weights into the memory at a second time different from the first time;

perform a third segmentation process that generates a third segmentation mask based on the 3D image of the transition region, wherein performing the third segmentation process comprises applying a third neural network trained to recognize bones in the transition region, and applying the third neural network comprises loading a third set of weights into the memory at a third time different from the first time and the second time;

composite the first segmentation mask, the second segmentation mask, and the third segmentation mask to generate a fourth segmentation mask; and output the fourth segmentation mask for display.

8. The non-transitory computer-readable storage medium of claim 7, wherein:

execution of the instructions causes the processing circuitry to, as part of partitioning the 3D image of the set of bones, partition the 3D image of the set of bones in the lower extremity such that cuneiform bones of the lower extremity are partially in the 3D image of the ankle region, partially in the 3D image of the forefoot region, and entirely in the 3D image of the transition region, and execution of the instructions causes the processing circuitry is configured to, as part of compositing the first segmentation mask, the second segmentation mask, and the third segmentation mask, use voxels associated with the cuneiform bones in the third segmentation mask in the fourth segmentation mask and not use any labels associated with the cuneiform bones in the first and second segmentation masks in the fourth segmentation mask.

9. The non-transitory computer-readable storage medium of claim 7, wherein to perform the first segmentation process, the second segmentation process, or performing the third segmentation process, execution of the instructions causes the processing circuitry to:

generate an initial segmentation mask by applying a neural network to an applicable 3D image, wherein the applicable 3D image is one of the 3D image of the ankle region, the 3D image of the forefoot region, or the 3D image of the transition region, and the initial segmentation mask includes data that associate voxels of the applicable 3D image with individual bones of an applicable set of bones;

generate a refined segmentation mask based on the initial segmentation mask, wherein generating the refined segmentation mask comprises:

generating input voxel values for voxels in the applicable 3D image; and for each respective bone of the applicable set of bones, performing a front propagation process for the respective bone, wherein performing the front propagation process for the respective bone:

identifying voxels of the applicable 3D image reached by a front propagated by the front propagation process for the respective bone, wherein the front starts from an initial voxel associated with the respective bone in the initial segmentation mask; and relabeling, in the refined segmentation mask, the identified voxels of the applicable 3D image as being associated with the respective bone, wherein the front propagation process for the respective bone determines a first cost value for a current voxel of the applicable 3D image based on an input voxel data value for the current voxel and determines whether the front propagates to the current voxel based on a comparison of the first cost value for the current voxel as determined by the front propagation process for the respective bone and a second cost value for the current voxel as determined by the front propagation process for a different individual bone of the applicable set of bones; and output the refined segmentation mask.

* * * * *